US012033564B2

(12) United States Patent
Taylor, Jr. et al.

(10) Patent No.: US 12,033,564 B2
(45) Date of Patent: Jul. 9, 2024

(54) DISPLAY DEVICE WITH HALO

(71) Applicant: Johnson Controls Technology Company, Auburn Hills, MI (US)

(72) Inventors: John Robert Taylor, Jr., Lawrenceville, GA (US); John Michael Reiszl, Grayson, GA (US); Damon Bryan Smith, Alto, GA (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 17/387,148

(22) Filed: Jul. 28, 2021

(65) Prior Publication Data

US 2021/0358395 A1 Nov. 18, 2021

Related U.S. Application Data

(63) Continuation of application No. 16/246,447, filed on Jan. 11, 2019, now Pat. No. 11,107,390.

(Continued)

(51) Int. Cl.
*G09G 3/32* (2016.01)
*F21V 8/00* (2006.01)
(Continued)

(52) U.S. Cl.
CPC ............. *G09G 3/32* (2013.01); *G02B 6/0016* (2013.01); *H05B 45/10* (2020.01); *H05B 45/20* (2020.01)

(58) Field of Classification Search
CPC .. G02B 6/0008; G02B 6/0016; G02B 6/0028; G02B 6/0068; G09G 3/32; H05B 45/10; H05B 45/20; H05B 45/28
See application file for complete search history.

(56) References Cited

U.S. PATENT DOCUMENTS

| 4,084,438 A | 4/1978 | Lee et al. |
| 4,107,464 A | 8/1978 | Lynch et al. |

(Continued)

FOREIGN PATENT DOCUMENTS

| CA | 2466854 C | 4/2008 |
| CA | 2633200 C | 1/2011 |

(Continued)

OTHER PUBLICATIONS

Cuevas et al., Integrating Gesture-Based Identification in Context-Aware Applications: A System Approach, 2014, 8 pages.

(Continued)

*Primary Examiner* — Robin J Mishler
(74) *Attorney, Agent, or Firm* — Foley & Lardner LLP

(57) ABSTRACT

A display device includes a front portion, a rear portion, a halo, and sides extending between the front portion and the rear portion. The front portion, the rear portion, and the sides form an enclosure. The halo includes a rim and an internal structure. The rim is positioned between the front portion and the rear portion. The internal structure is at least partially within the enclosure and includes a sweep portion and a receiving post. The receiving post and the sweep portion are configured to receive light emitted by one or more light emitting devices and at least one of guide, direct, diffuse, focus, and scatter light emitted by the one or more light emitting devices out of the display device.

20 Claims, 20 Drawing Sheets

Related U.S. Application Data

(60) Provisional application No. 62/783,580, filed on Dec. 21, 2018.

(51) Int. Cl.
  *H05B 45/10* (2020.01)
  *H05B 45/20* (2020.01)

(56) References Cited

U.S. PATENT DOCUMENTS

| | | |
|---|---|---|
| 4,150,718 A | 4/1979 | Kolbow et al. |
| 4,873,649 A | 10/1989 | Grald et al. |
| 4,942,613 A | 7/1990 | Lynch |
| 4,973,029 A | 11/1990 | Robbins, III |
| 5,052,186 A | 10/1991 | Dudley et al. |
| 5,062,276 A | 11/1991 | Dudley |
| 5,224,648 A | 7/1993 | Simon et al. |
| 5,797,729 A | 8/1998 | Rafuse et al. |
| 5,944,098 A | 8/1999 | Jackson |
| 6,121,885 A | 9/2000 | Masone et al. |
| 6,164,374 A | 12/2000 | Rhodes et al. |
| 6,169,937 B1 | 1/2001 | Peterson |
| 6,193,395 B1 | 2/2001 | Logan |
| 6,227,961 B1 | 5/2001 | Moore et al. |
| 6,260,765 B1 | 7/2001 | Natale et al. |
| 6,314,750 B1 | 11/2001 | Ishikawa et al. |
| 6,351,693 B1 | 2/2002 | Monie et al. |
| 6,435,418 B1 | 8/2002 | Toth et al. |
| 6,478,233 B1 | 11/2002 | Shah |
| 6,487,869 B1 | 12/2002 | Sulc et al. |
| 6,557,771 B2 | 5/2003 | Shah |
| 6,641,054 B2 | 11/2003 | Morey |
| 6,693,514 B2 | 2/2004 | Perea et al. |
| 6,724,403 B1 | 4/2004 | Santoro et al. |
| 6,726,112 B1 | 4/2004 | Ho |
| 6,726,113 B2 | 4/2004 | Guo |
| 6,771,172 B1 | 8/2004 | Robinson et al. |
| 6,789,429 B2 | 9/2004 | Pinto et al. |
| 6,810,307 B1 | 10/2004 | Addy |
| 6,824,069 B2 | 11/2004 | Rosen |
| 6,827,465 B2 | 12/2004 | Shemitz et al. |
| 6,851,621 B1 | 2/2005 | Wacker et al. |
| 6,874,691 B1 | 4/2005 | Hildebrand et al. |
| 6,888,441 B2 | 5/2005 | Carey |
| 6,912,429 B1 | 6/2005 | Bilger |
| 6,995,518 B2 | 2/2006 | Havlik et al. |
| 7,028,912 B1 | 4/2006 | Rosen |
| 7,083,109 B2 | 8/2006 | Pouchak |
| 7,099,748 B2 | 8/2006 | Rayburn |
| 7,140,551 B2 | 11/2006 | De Pauw et al. |
| 7,146,253 B2 | 12/2006 | Hoog et al. |
| 7,152,806 B1 | 12/2006 | Rosen |
| 7,156,317 B1 | 1/2007 | Moore |
| 7,156,318 B1 | 1/2007 | Rosen |
| 7,159,789 B2 | 1/2007 | Schwendinger et al. |
| 7,159,790 B2 | 1/2007 | Schwendinger et al. |
| 7,167,079 B2 | 1/2007 | Smyth et al. |
| 7,188,002 B2 | 3/2007 | Chapman et al. |
| 7,212,887 B2 | 5/2007 | Shah et al. |
| 7,225,054 B2 | 5/2007 | Amundson et al. |
| 7,232,075 B1 | 6/2007 | Rosen |
| 7,261,243 B2 | 8/2007 | Butler et al. |
| 7,274,972 B2 | 9/2007 | Amundson et al. |
| 7,287,709 B2 | 10/2007 | Proffitt et al. |
| 7,296,426 B2 | 11/2007 | Butler et al. |
| 7,299,996 B2 | 11/2007 | Garrett et al. |
| 7,306,165 B2 | 12/2007 | Shah |
| 7,308,384 B2 | 12/2007 | Shah et al. |
| 7,317,970 B2 | 1/2008 | Pienta et al. |
| 7,331,187 B2 | 2/2008 | Kates |
| 7,343,751 B2 | 3/2008 | Kates |
| 7,348,925 B2 | 3/2008 | Noro et al. |
| 7,383,158 B2 | 6/2008 | Krocker et al. |
| RE40,437 E | 7/2008 | Rosen |
| 7,402,780 B2 | 7/2008 | Mueller et al. |
| 7,434,744 B2 | 10/2008 | Garozzo et al. |
| 7,442,012 B2 | 10/2008 | Moens |
| 7,451,917 B2 | 11/2008 | McCall et al. |
| 7,469,550 B2 | 12/2008 | Chapman et al. |
| 7,475,558 B2 | 1/2009 | Perry |
| 7,475,828 B2 | 1/2009 | Bartlett et al. |
| 7,556,207 B2 | 7/2009 | Mueller et al. |
| 7,565,813 B2 | 7/2009 | Pouchak |
| 7,575,179 B2 | 8/2009 | Morrow et al. |
| 7,584,897 B2 | 9/2009 | Schultz et al. |
| 7,592,713 B2 | 9/2009 | Bryan et al. |
| 7,614,567 B2 | 11/2009 | Chapman et al. |
| 7,624,931 B2 | 12/2009 | Chapman et al. |
| 7,633,743 B2 | 12/2009 | Barton et al. |
| 7,636,604 B2 | 12/2009 | Bergman et al. |
| 7,638,739 B2 | 12/2009 | Rhodes et al. |
| 7,641,126 B2 | 1/2010 | Schultz et al. |
| 7,645,158 B2 | 1/2010 | Mulhouse et al. |
| 7,667,163 B2 | 2/2010 | Ashworth et al. |
| 7,726,581 B2 | 6/2010 | Naujok et al. |
| 7,731,096 B2 | 6/2010 | Lorenz et al. |
| 7,731,098 B2 | 6/2010 | Butler et al. |
| 7,740,184 B2 | 6/2010 | Schnell et al. |
| 7,748,225 B2 | 7/2010 | Butler et al. |
| 7,748,639 B2 | 7/2010 | Perry |
| 7,748,640 B2 | 7/2010 | Roher et al. |
| 7,755,220 B2 | 7/2010 | Sorg et al. |
| 7,765,826 B2 | 8/2010 | Nichols |
| 7,774,102 B2 | 8/2010 | Butler et al. |
| 7,775,452 B2 | 8/2010 | Shah et al. |
| 7,784,291 B2 | 8/2010 | Butler et al. |
| 7,784,704 B2 | 8/2010 | Harter |
| 7,802,618 B2 | 9/2010 | Simon et al. |
| 7,832,221 B2 | 11/2010 | Wijaya et al. |
| 7,832,652 B2 | 11/2010 | Barton et al. |
| 7,845,576 B2 | 12/2010 | Siddaramanna et al. |
| 7,861,941 B2 | 1/2011 | Schultz et al. |
| 7,867,646 B2 | 1/2011 | Rhodes |
| 7,904,209 B2 | 3/2011 | Podgorny et al. |
| 7,904,830 B2 | 3/2011 | Hoglund et al. |
| 7,908,116 B2 | 3/2011 | Steinberg et al. |
| 7,908,117 B2 | 3/2011 | Steinberg et al. |
| 7,918,406 B2 | 4/2011 | Rosen |
| 7,938,336 B2 | 5/2011 | Rhodes et al. |
| 7,941,294 B2 | 5/2011 | Shahi et al. |
| 7,954,726 B2 | 6/2011 | Siddaramanna et al. |
| 7,963,454 B2 | 6/2011 | Sullivan et al. |
| 7,979,164 B2 | 7/2011 | Garozzo et al. |
| 7,992,794 B2 | 8/2011 | Leen et al. |
| 8,010,237 B2 | 8/2011 | Cheung et al. |
| 8,032,254 B2 | 10/2011 | Amundson et al. |
| 8,078,326 B2 | 12/2011 | Harrod et al. |
| 8,082,065 B2 | 12/2011 | Imes et al. |
| 8,083,154 B2 | 12/2011 | Schultz et al. |
| 8,089,032 B2 | 1/2012 | Beland et al. |
| 8,091,794 B2 | 1/2012 | Siddaramanna et al. |
| 8,099,195 B2 | 1/2012 | Imes et al. |
| 8,108,076 B2 | 1/2012 | Imes et al. |
| 8,131,506 B2 | 3/2012 | Steinberg et al. |
| 8,141,791 B2 | 3/2012 | Rosen |
| 8,167,216 B2 | 5/2012 | Schultz et al. |
| 8,180,492 B2 | 5/2012 | Steinberg |
| 8,182,106 B2 | 5/2012 | Shin et al. |
| 8,190,296 B2 | 5/2012 | Alhilo |
| 8,195,313 B1 | 6/2012 | Fadell et al. |
| 8,196,185 B2 | 6/2012 | Geadelmann et al. |
| 8,209,059 B2 | 6/2012 | Stockton |
| 8,239,066 B2 | 8/2012 | Jennings et al. |
| 8,275,918 B2 | 9/2012 | Bourbeau et al. |
| 8,276,829 B2 | 10/2012 | Stoner et al. |
| 8,280,536 B1 | 10/2012 | Fadell et al. |
| 8,280,556 B2 | 10/2012 | Besore et al. |
| 8,289,182 B2 | 10/2012 | Vogel et al. |
| 8,289,226 B2 | 10/2012 | Takach et al. |
| 8,299,919 B2 | 10/2012 | Dayton et al. |
| 8,321,058 B2 | 11/2012 | Zhou et al. |
| 8,346,396 B2 | 1/2013 | Amundson et al. |
| 8,387,891 B1 | 3/2013 | Simon et al. |
| 8,393,550 B2 | 3/2013 | Simon et al. |

(56) References Cited

U.S. PATENT DOCUMENTS

| | | |
|---|---|---|
| 8,412,382 B2 | 4/2013 | Imes et al. |
| 8,412,488 B2 | 4/2013 | Steinberg et al. |
| 8,416,084 B2 | 4/2013 | Beltmann et al. |
| 8,419,236 B2 | 4/2013 | Fisher et al. |
| 8,429,435 B1 | 4/2013 | Clayton et al. |
| 8,429,566 B2 | 4/2013 | Koushik et al. |
| 8,447,070 B1 | 5/2013 | Bozarth et al. |
| 8,456,293 B1 | 6/2013 | Trundle et al. |
| 8,473,109 B1 | 6/2013 | Imes et al. |
| 8,476,964 B1 | 7/2013 | Atri |
| 8,489,243 B2 | 7/2013 | Fadell et al. |
| 8,498,749 B2 | 7/2013 | Imes et al. |
| 8,504,180 B2 | 8/2013 | Imes et al. |
| 8,510,255 B2 | 8/2013 | Fadell et al. |
| 8,511,576 B2 | 8/2013 | Warren et al. |
| 8,511,577 B2 | 8/2013 | Warren et al. |
| 8,517,088 B2 | 8/2013 | Moore et al. |
| 8,523,083 B2 | 9/2013 | Warren et al. |
| 8,523,084 B2 | 9/2013 | Siddaramanna et al. |
| 8,527,096 B2 | 9/2013 | Pavlak et al. |
| 8,532,827 B2 | 9/2013 | Stefanski et al. |
| 8,538,588 B2 | 9/2013 | Kasper |
| 8,544,285 B2 | 10/2013 | Stefanski et al. |
| 8,549,658 B2 | 10/2013 | Kolavennu et al. |
| 8,550,368 B2 | 10/2013 | Butler et al. |
| 8,554,374 B2 | 10/2013 | Lunacek et al. |
| 8,555,662 B2 | 10/2013 | Peterson et al. |
| 8,558,179 B2 | 10/2013 | Filson et al. |
| 8,560,127 B2 | 10/2013 | Leen et al. |
| 8,560,128 B2 | 10/2013 | Ruff et al. |
| 8,571,518 B2 | 10/2013 | Imes et al. |
| 8,581,439 B1 | 11/2013 | Clayton et al. |
| 8,594,850 B1 | 11/2013 | Gourlay et al. |
| 8,596,550 B2 | 12/2013 | Steinberg et al. |
| 8,600,564 B2 | 12/2013 | Imes et al. |
| 8,606,409 B2 | 12/2013 | Amundson et al. |
| 8,613,792 B2 | 12/2013 | Ragland et al. |
| 8,620,841 B1 | 12/2013 | Filson et al. |
| 8,622,314 B2 | 1/2014 | Fisher et al. |
| 8,626,344 B2 | 1/2014 | Imes et al. |
| 8,630,741 B1 | 1/2014 | Matsuoka et al. |
| 8,630,742 B1 | 1/2014 | Stefanski et al. |
| 8,644,009 B2 | 2/2014 | Rylski et al. |
| 8,659,302 B1 | 2/2014 | Warren et al. |
| 8,671,702 B1 | 3/2014 | Shotey et al. |
| 8,674,816 B2 | 3/2014 | Trundle et al. |
| 8,689,572 B2 | 4/2014 | Evans et al. |
| 8,695,887 B2 | 4/2014 | Helt et al. |
| 8,706,270 B2 | 4/2014 | Fadell et al. |
| 8,708,242 B2 | 4/2014 | Conner et al. |
| 8,712,590 B2 | 4/2014 | Steinberg |
| 8,718,826 B2 | 5/2014 | Ramachandran et al. |
| 8,726,680 B2 | 5/2014 | Schenk et al. |
| 8,727,611 B2 | 5/2014 | Huppi et al. |
| 8,738,327 B2 | 5/2014 | Steinberg et al. |
| 8,746,583 B2 | 6/2014 | Simon et al. |
| 8,752,771 B2 | 6/2014 | Warren et al. |
| 8,754,780 B2 | 6/2014 | Petite et al. |
| 8,766,194 B2 | 7/2014 | Filson et al. |
| 8,770,490 B2 | 7/2014 | Drew |
| 8,770,491 B2 | 7/2014 | Warren et al. |
| 8,788,100 B2 | 7/2014 | Grohman et al. |
| 8,788,103 B2 | 7/2014 | Warren et al. |
| 8,802,981 B2 | 8/2014 | Wallaert et al. |
| 8,830,267 B2 | 9/2014 | Brackney |
| 8,838,282 B1 | 9/2014 | Ratliff et al. |
| 8,843,239 B2 | 9/2014 | Mighdoll et al. |
| 8,850,348 B2 | 9/2014 | Fadell et al. |
| 8,855,830 B2 | 10/2014 | Imes et al. |
| 8,868,219 B2 | 10/2014 | Fadell et al. |
| 8,870,086 B2 | 10/2014 | Tessier et al. |
| 8,870,087 B2 | 10/2014 | Pienta et al. |
| 8,880,047 B2 | 11/2014 | Konicek et al. |
| 8,893,032 B2 | 11/2014 | Bruck et al. |
| 8,893,555 B2 | 11/2014 | Bourbeau et al. |
| 8,903,552 B2 | 12/2014 | Amundson et al. |
| 8,918,219 B2 | 12/2014 | Sloo et al. |
| 8,942,853 B2 | 1/2015 | Stefanski et al. |
| 8,944,338 B2 | 2/2015 | Warren et al. |
| 8,950,686 B2 | 2/2015 | Matsuoka et al. |
| 8,950,687 B2 | 2/2015 | Bergman et al. |
| 8,961,005 B2 | 2/2015 | Huppi et al. |
| 8,978,994 B2 | 3/2015 | Moore et al. |
| 8,998,102 B2 | 4/2015 | Fadell et al. |
| 9,014,686 B2 | 4/2015 | Ramachandran et al. |
| 9,014,860 B2 | 4/2015 | Moore et al. |
| 9,020,647 B2 | 4/2015 | Johnson et al. |
| 9,026,232 B2 | 5/2015 | Fadell et al. |
| 9,033,255 B2 | 5/2015 | Tessier et al. |
| RE45,574 E | 6/2015 | Harter |
| 9,074,784 B2 | 7/2015 | Sullivan et al. |
| 9,075,419 B2 | 7/2015 | Sloo et al. |
| 9,077,055 B2 | 7/2015 | Yau |
| 9,080,782 B1 | 7/2015 | Sheikh |
| 9,081,393 B2 | 7/2015 | Lunacek et al. |
| 9,086,703 B2 | 7/2015 | Warren et al. |
| 9,088,306 B1 | 7/2015 | Ramachandran et al. |
| 9,092,039 B2 | 7/2015 | Fadell et al. |
| 9,098,279 B2 | 8/2015 | Mucignat et al. |
| 9,113,156 B2 | 8/2015 | Sugiyama et al. |
| 9,116,529 B2 | 8/2015 | Warren et al. |
| 9,121,623 B2 | 9/2015 | Filson et al. |
| 9,122,283 B2 | 9/2015 | Rylski et al. |
| 9,125,049 B2 | 9/2015 | Huang et al. |
| 9,127,853 B2 | 9/2015 | Filson et al. |
| 9,131,904 B2 | 9/2015 | Qualey et al. |
| 9,134,710 B2 | 9/2015 | Cheung et al. |
| 9,134,715 B2 | 9/2015 | Geadelmann et al. |
| 9,146,041 B2 | 9/2015 | Novotny et al. |
| 9,151,510 B2 | 10/2015 | Leen |
| 9,154,001 B2 | 10/2015 | Dharwada et al. |
| 9,157,764 B2 | 10/2015 | Shetty et al. |
| 9,164,524 B2 | 10/2015 | Imes et al. |
| 9,175,868 B2 | 11/2015 | Fadell et al. |
| 9,175,871 B2 | 11/2015 | Gourlay et al. |
| 9,182,141 B2 | 11/2015 | Sullivan et al. |
| 9,189,751 B2 | 11/2015 | Matsuoka et al. |
| 9,191,277 B2 | 11/2015 | Rezvani et al. |
| 9,191,909 B2 | 11/2015 | Rezvani et al. |
| 9,194,597 B2 | 11/2015 | Steinberg et al. |
| 9,194,598 B2 | 11/2015 | Fadell et al. |
| 9,194,600 B2 | 11/2015 | Kates |
| 9,207,817 B2 | 12/2015 | Tu |
| 9,213,342 B2 | 12/2015 | Drake et al. |
| 9,215,281 B2 | 12/2015 | Iggulden et al. |
| 9,222,693 B2 | 12/2015 | Gourlay et al. |
| 9,223,323 B2 | 12/2015 | Matas et al. |
| 9,234,669 B2 | 1/2016 | Filson et al. |
| 9,244,445 B2 | 1/2016 | Finch et al. |
| 9,244,470 B2 | 1/2016 | Steinberg |
| 9,261,287 B2 | 2/2016 | Warren et al. |
| 9,268,344 B2 | 2/2016 | Warren et al. |
| 9,279,595 B2 | 3/2016 | Mighdoll et al. |
| 9,282,590 B2 | 3/2016 | Donlan |
| 9,285,134 B2 | 3/2016 | Bray et al. |
| 9,285,802 B2 | 3/2016 | Arensmeier |
| 9,286,781 B2 | 3/2016 | Filson et al. |
| 9,291,359 B2 | 3/2016 | Fadell et al. |
| 9,292,022 B2 | 3/2016 | Ramachandran et al. |
| 9,298,196 B2 | 3/2016 | Matsuoka et al. |
| 9,298,197 B2 | 3/2016 | Matsuoka et al. |
| 9,304,366 B2 | 4/2016 | Kubo |
| 9,319,234 B2 | 4/2016 | Davis et al. |
| 9,353,965 B1 | 5/2016 | Goyal et al. |
| D763,707 S | 8/2016 | Sinha et al. |
| 9,453,340 B2 | 9/2016 | Van Herpen et al. |
| 9,588,506 B1 | 3/2017 | Clayton |
| 9,589,459 B2 | 3/2017 | Davis et al. |
| 9,618,185 B2 | 4/2017 | Ricci et al. |
| D790,369 S | 6/2017 | Sinha et al. |
| 9,696,701 B2 | 7/2017 | Vasylyev |
| 9,727,063 B1 | 8/2017 | Shilts et al. |
| 9,762,408 B2 | 9/2017 | Davis et al. |
| 9,824,549 B2 | 11/2017 | Taylor et al. |

(56) References Cited

U.S. PATENT DOCUMENTS

| | | |
|---|---|---|
| 9,857,238 B2 | 1/2018 | Malhotra et al. |
| D810,591 S | 2/2018 | Ribbich et al. |
| 9,887,887 B2 | 2/2018 | Hunter et al. |
| 9,890,971 B2 | 2/2018 | Ribbich et al. |
| 9,924,026 B2 | 3/2018 | Kenjalkar et al. |
| D814,321 S | 4/2018 | Abdala et al. |
| 9,964,328 B2 | 5/2018 | Ribbich et al. |
| 10,019,739 B1 | 7/2018 | Packer et al. |
| 10,031,534 B1 | 7/2018 | Devenish et al. |
| 10,119,712 B2 | 11/2018 | Grosshart et al. |
| 2001/0015281 A1 | 8/2001 | Schiedegger et al. |
| 2001/0044795 A1 | 11/2001 | Cohen et al. |
| 2002/0123843 A1 | 9/2002 | Hood |
| 2003/0034897 A1 | 2/2003 | Shamoon et al. |
| 2003/0034898 A1 | 2/2003 | Shamoon et al. |
| 2003/0037034 A1 | 2/2003 | Daniels et al. |
| 2003/0079387 A1 | 5/2003 | Derose |
| 2003/0136853 A1 | 7/2003 | Morey |
| 2003/0177012 A1 | 9/2003 | Drennan |
| 2003/0182394 A1 | 9/2003 | Ryngler et al. |
| 2004/0074978 A1 | 4/2004 | Rosen |
| 2004/0125940 A1 | 7/2004 | Turcan et al. |
| 2004/0249479 A1 | 12/2004 | Shorrock |
| 2004/0262410 A1 | 12/2004 | Hull |
| 2005/0012633 A1 | 1/2005 | Yoon |
| 2005/0040943 A1 | 2/2005 | Winick |
| 2005/0055357 A1 | 3/2005 | Campbell |
| 2005/0083168 A1 | 4/2005 | Breitenbach |
| 2005/0119794 A1 | 6/2005 | Amundson et al. |
| 2005/0145705 A1 | 7/2005 | Shah et al. |
| 2005/0156049 A1 | 7/2005 | Van Ostrand et al. |
| 2005/0194456 A1 | 9/2005 | Tessier et al. |
| 2005/0195757 A1 | 9/2005 | Kidder et al. |
| 2005/0219860 A1 | 10/2005 | Schexnaider |
| 2005/0270151 A1 | 12/2005 | Winick |
| 2005/0270735 A1 | 12/2005 | Chen |
| 2006/0038025 A1 | 2/2006 | Lee |
| 2006/0113398 A1 | 6/2006 | Ashworth |
| 2006/0186214 A1 | 8/2006 | Simon et al. |
| 2006/0192022 A1 | 8/2006 | Barton et al. |
| 2006/0226970 A1 | 10/2006 | Saga et al. |
| 2006/0238517 A1 | 10/2006 | King et al. |
| 2006/0260334 A1 | 11/2006 | Carey et al. |
| 2006/0265489 A1 | 11/2006 | Moore |
| 2006/0267788 A1 | 11/2006 | Delany |
| 2007/0013532 A1 | 1/2007 | Ehlers |
| 2007/0045431 A1 | 3/2007 | Chapman et al. |
| 2007/0050732 A1 | 3/2007 | Chapman et al. |
| 2007/0057079 A1 | 3/2007 | Stark et al. |
| 2007/0114295 A1 | 5/2007 | Jenkins |
| 2007/0121334 A1 | 5/2007 | Bourdin et al. |
| 2007/0138496 A1 | 6/2007 | Zhao et al. |
| 2007/0198099 A9 | 8/2007 | Shah |
| 2007/0228182 A1 | 10/2007 | Wagner et al. |
| 2007/0228183 A1 | 10/2007 | Kennedy et al. |
| 2007/0241203 A1 | 10/2007 | Wagner et al. |
| 2008/0015740 A1 | 1/2008 | Osann |
| 2008/0040502 A1 | 2/2008 | Holsberry |
| 2008/0048046 A1 | 2/2008 | Wagner et al. |
| 2008/0054084 A1 | 3/2008 | Olson |
| 2008/0073440 A1 | 3/2008 | Butler et al. |
| 2008/0099568 A1 | 5/2008 | Nicodem et al. |
| 2008/0120446 A1 | 5/2008 | Butler et al. |
| 2008/0151458 A1 | 6/2008 | Beland et al. |
| 2008/0158178 A1 | 7/2008 | Hotelling et al. |
| 2008/0161978 A1 | 7/2008 | Shah |
| 2008/0182506 A1 | 7/2008 | Jackson et al. |
| 2008/0216495 A1 | 9/2008 | Kates |
| 2008/0221714 A1 | 9/2008 | Schoettle |
| 2008/0223051 A1 | 9/2008 | Kates |
| 2008/0227430 A1 | 9/2008 | Polk |
| 2008/0277486 A1 | 11/2008 | Seem et al. |
| 2008/0280637 A1 | 11/2008 | Shaffer et al. |
| 2008/0289347 A1 | 11/2008 | Kadle et al. |
| 2008/0290183 A1 | 11/2008 | Laberge et al. |
| 2008/0294274 A1 | 11/2008 | Laberge et al. |
| 2008/0295030 A1 | 11/2008 | Laberge et al. |
| 2008/0297591 A1 | 12/2008 | Aarts et al. |
| 2009/0065596 A1 | 3/2009 | Seem et al. |
| 2009/0122329 A1 | 5/2009 | Hegemier et al. |
| 2009/0140065 A1 | 6/2009 | Juntunen et al. |
| 2009/0143880 A1 | 6/2009 | Amundson et al. |
| 2009/0143918 A1 | 6/2009 | Amundson et al. |
| 2009/0144015 A1 | 6/2009 | Bedard |
| 2009/0148827 A1 | 6/2009 | Argott |
| 2009/0251422 A1 | 10/2009 | Wu et al. |
| 2009/0276096 A1 | 11/2009 | Proffitt et al. |
| 2010/0070089 A1 | 3/2010 | Harrod et al. |
| 2010/0070092 A1 | 3/2010 | Winter et al. |
| 2010/0084482 A1 | 4/2010 | Kennedy et al. |
| 2010/0101854 A1 | 4/2010 | Wallaert et al. |
| 2010/0106334 A1 | 4/2010 | Grohman et al. |
| 2010/0107076 A1 | 4/2010 | Grohman et al. |
| 2010/0131884 A1 | 5/2010 | Shah |
| 2010/0145536 A1 | 6/2010 | Masters et al. |
| 2010/0163633 A1 | 7/2010 | Barrett et al. |
| 2010/0163635 A1 | 7/2010 | Ye |
| 2010/0171889 A1 | 7/2010 | Pantel et al. |
| 2010/0182743 A1 | 7/2010 | Roher |
| 2010/0190479 A1 | 7/2010 | Scott et al. |
| 2010/0204834 A1 | 8/2010 | Comerford et al. |
| 2010/0212198 A1 | 8/2010 | Matsunaga et al. |
| 2010/0212879 A1 | 8/2010 | Schnell et al. |
| 2010/0250707 A1 | 9/2010 | Dalley et al. |
| 2010/0262298 A1 | 10/2010 | Johnson et al. |
| 2010/0289412 A1 | 11/2010 | Middleton-White et al. |
| 2010/0304841 A1 | 12/2010 | Sammon et al. |
| 2010/0327766 A1 | 12/2010 | Recker et al. |
| 2011/0006887 A1 | 1/2011 | Shaull et al. |
| 2011/0046798 A1 | 2/2011 | Imes et al. |
| 2011/0067851 A1 | 3/2011 | Terlson et al. |
| 2011/0087988 A1 | 4/2011 | Ray et al. |
| 2011/0088416 A1 | 4/2011 | Koethler |
| 2011/0128378 A1 | 6/2011 | Raji |
| 2011/0132991 A1 | 6/2011 | Moody et al. |
| 2011/0133655 A1 | 6/2011 | Recker et al. |
| 2011/0137467 A1 | 6/2011 | Leen et al. |
| 2011/0153090 A1 | 6/2011 | Besore et al. |
| 2011/0181412 A1 | 7/2011 | Alexander et al. |
| 2011/0209097 A1 | 8/2011 | Hinckley et al. |
| 2011/0225859 A1 | 9/2011 | Safavi |
| 2011/0238224 A1 | 9/2011 | Schnell et al. |
| 2011/0254450 A1 | 10/2011 | Bergholz et al. |
| 2011/0264279 A1 | 10/2011 | Poth |
| 2011/0290893 A1 | 12/2011 | Steinberg |
| 2012/0001873 A1 | 1/2012 | Wu et al. |
| 2012/0007555 A1 | 1/2012 | Bukow |
| 2012/0007804 A1 | 1/2012 | Morrison et al. |
| 2012/0029713 A1 | 2/2012 | Spicer et al. |
| 2012/0046859 A1 | 2/2012 | Imes et al. |
| 2012/0048955 A1 | 3/2012 | Lin et al. |
| 2012/0061480 A1 | 3/2012 | Deligiannis et al. |
| 2012/0067561 A1 | 3/2012 | Bergman et al. |
| 2012/0093141 A1 | 4/2012 | Imes et al. |
| 2012/0095601 A1 | 4/2012 | Abraham et al. |
| 2012/0101637 A1 | 4/2012 | Imes et al. |
| 2012/0123594 A1 | 5/2012 | Finch et al. |
| 2012/0126020 A1 | 5/2012 | Filson et al. |
| 2012/0126021 A1 | 5/2012 | Warren et al. |
| 2012/0130547 A1 | 5/2012 | Fadell et al. |
| 2012/0131504 A1 | 5/2012 | Fadell et al. |
| 2012/0165993 A1 | 6/2012 | Whitehouse |
| 2012/0179727 A1 | 7/2012 | Esser |
| 2012/0181010 A1 | 7/2012 | Schultz et al. |
| 2012/0191257 A1 | 7/2012 | Corcoran et al. |
| 2012/0193437 A1 | 8/2012 | Henry et al. |
| 2012/0229521 A1 | 9/2012 | Hales et al. |
| 2012/0230661 A1 | 9/2012 | Alhilo |
| 2012/0239207 A1 | 9/2012 | Fadell et al. |
| 2012/0252430 A1 | 10/2012 | Imes et al. |
| 2012/0259469 A1 | 10/2012 | Ward et al. |
| 2012/0259470 A1 | 10/2012 | Nijhawan et al. |
| 2012/0290230 A1 | 11/2012 | Berges Gonzalez et al. |
| 2012/0298763 A1 | 11/2012 | Young |

(56) References Cited

U.S. PATENT DOCUMENTS

| | | |
|---|---|---|
| 2012/0303165 A1 | 11/2012 | Qu et al. |
| 2012/0303828 A1 | 11/2012 | Young et al. |
| 2012/0310418 A1 | 12/2012 | Harrod et al. |
| 2012/0310708 A1 | 12/2012 | Curtis et al. |
| 2012/0315848 A1 | 12/2012 | Smith et al. |
| 2012/0316687 A1 | 12/2012 | Chen et al. |
| 2013/0002447 A1 | 1/2013 | Vogel et al. |
| 2013/0024187 A1 | 1/2013 | Chang et al. |
| 2013/0030600 A1 | 1/2013 | Shetty et al. |
| 2013/0054758 A1 | 2/2013 | Imes et al. |
| 2013/0057381 A1 | 3/2013 | Kandhasamy |
| 2013/0073093 A1 | 3/2013 | Songkakul |
| 2013/0087628 A1 | 4/2013 | Nelson et al. |
| 2013/0090767 A1 | 4/2013 | Bruck et al. |
| 2013/0099008 A1 | 4/2013 | Aljabari et al. |
| 2013/0099009 A1 | 4/2013 | Filson et al. |
| 2013/0123991 A1 | 5/2013 | Richmond |
| 2013/0138250 A1 | 5/2013 | Mowery et al. |
| 2013/0144443 A1 | 6/2013 | Casson et al. |
| 2013/0151016 A1 | 6/2013 | Bias et al. |
| 2013/0151018 A1 | 6/2013 | Bias et al. |
| 2013/0158721 A1 | 6/2013 | Somasundaram et al. |
| 2013/0163300 A1 | 6/2013 | Zhao et al. |
| 2013/0166075 A1 | 6/2013 | Castillo et al. |
| 2013/0180700 A1 | 7/2013 | Aycock |
| 2013/0190932 A1 | 7/2013 | Schuman |
| 2013/0190940 A1 | 7/2013 | Sloop et al. |
| 2013/0204408 A1 | 8/2013 | Thiruvengada et al. |
| 2013/0204441 A1 | 8/2013 | Sloo et al. |
| 2013/0204442 A1 | 8/2013 | Modi et al. |
| 2013/0211600 A1 | 8/2013 | Dean-Hendricks et al. |
| 2013/0215058 A1 | 8/2013 | Brazell et al. |
| 2013/0221117 A1 | 8/2013 | Warren et al. |
| 2013/0228633 A1 | 9/2013 | Toth et al. |
| 2013/0234840 A1 | 9/2013 | Trundle et al. |
| 2013/0238142 A1 | 9/2013 | Nichols et al. |
| 2013/0245838 A1 | 9/2013 | Zywicki et al. |
| 2013/0261803 A1 | 10/2013 | Kolavennu |
| 2013/0261807 A1 | 10/2013 | Zywicki et al. |
| 2013/0268125 A1 | 10/2013 | Matsuoka |
| 2013/0268129 A1 | 10/2013 | Fadell et al. |
| 2013/0271670 A1 | 10/2013 | Sakata et al. |
| 2013/0292481 A1 | 11/2013 | Filson et al. |
| 2013/0297078 A1 | 11/2013 | Kolavennu |
| 2013/0310418 A1 | 11/2013 | Brenchley et al. |
| 2013/0318217 A1 | 11/2013 | Imes et al. |
| 2013/0318444 A1 | 11/2013 | Imes et al. |
| 2013/0325190 A1 | 12/2013 | Imes et al. |
| 2013/0332000 A1 | 12/2013 | Imes et al. |
| 2013/0338837 A1 | 12/2013 | Hublou et al. |
| 2013/0338839 A1 | 12/2013 | Rogers et al. |
| 2013/0340993 A1 | 12/2013 | Siddaramanna et al. |
| 2013/0345882 A1 | 12/2013 | Dushane et al. |
| 2014/0000861 A1 | 1/2014 | Barrett et al. |
| 2014/0002461 A1 | 1/2014 | Wang |
| 2014/0031989 A1 | 1/2014 | Bergman et al. |
| 2014/0034284 A1 | 2/2014 | Butler et al. |
| 2014/0039692 A1 | 2/2014 | Leen et al. |
| 2014/0041846 A1 | 2/2014 | Leen et al. |
| 2014/0048608 A1 | 2/2014 | Frank |
| 2014/0052300 A1 | 2/2014 | Matsuoka et al. |
| 2014/0058806 A1 | 2/2014 | Guenette et al. |
| 2014/0070919 A1 | 3/2014 | Jackson et al. |
| 2014/0081466 A1 | 3/2014 | Huapeng et al. |
| 2014/0085093 A1 | 3/2014 | Mittleman et al. |
| 2014/0112331 A1 | 4/2014 | Rosen |
| 2014/0114706 A1 | 4/2014 | Blakely |
| 2014/0117103 A1 | 5/2014 | Rossi et al. |
| 2014/0118285 A1 | 5/2014 | Poplawski |
| 2014/0129034 A1 | 5/2014 | Stefanski et al. |
| 2014/0149270 A1 | 5/2014 | Lombard et al. |
| 2014/0151456 A1 | 6/2014 | McCurnin et al. |
| 2014/0152631 A1 | 6/2014 | Moore et al. |
| 2014/0156087 A1 | 6/2014 | Amundson |
| 2014/0158338 A1 | 6/2014 | Kates |
| 2014/0165612 A1 | 6/2014 | Qu et al. |
| 2014/0175181 A1 | 6/2014 | Warren et al. |
| 2014/0188288 A1 | 7/2014 | Fisher et al. |
| 2014/0191848 A1 | 7/2014 | Imes et al. |
| 2014/0207291 A1 | 7/2014 | Golden et al. |
| 2014/0207292 A1 | 7/2014 | Ramagem et al. |
| 2014/0214212 A1 | 7/2014 | Leen et al. |
| 2014/0216078 A1 | 8/2014 | Ladd |
| 2014/0217185 A1 | 8/2014 | Bicknell |
| 2014/0217186 A1 | 8/2014 | Kramer et al. |
| 2014/0228983 A1 | 8/2014 | Groskreutz et al. |
| 2014/0231530 A1 | 8/2014 | Warren et al. |
| 2014/0244047 A1 | 8/2014 | Oh et al. |
| 2014/0250397 A1 | 9/2014 | Kannan et al. |
| 2014/0250399 A1 | 9/2014 | Gaherwar |
| 2014/0254196 A1* | 9/2014 | Moriyama ............... F21S 43/26 362/611 |
| 2014/0262196 A1 | 9/2014 | Frank et al. |
| 2014/0262484 A1 | 9/2014 | Khoury et al. |
| 2014/0263679 A1 | 9/2014 | Conner et al. |
| 2014/0266669 A1 | 9/2014 | Fadell et al. |
| 2014/0267008 A1 | 9/2014 | Jain et al. |
| 2014/0277762 A1 | 9/2014 | Drew |
| 2014/0277769 A1 | 9/2014 | Matsuoka et al. |
| 2014/0277770 A1 | 9/2014 | Aljabari et al. |
| 2014/0297001 A1 | 10/2014 | Silverman |
| 2014/0299670 A1 | 10/2014 | Ramachandran et al. |
| 2014/0309792 A1 | 10/2014 | Drew |
| 2014/0312129 A1 | 10/2014 | Zikes et al. |
| 2014/0312131 A1 | 10/2014 | Tousignant et al. |
| 2014/0312694 A1 | 10/2014 | Tu et al. |
| 2014/0316584 A1 | 10/2014 | Matsuoka et al. |
| 2014/0316585 A1 | 10/2014 | Boesveld et al. |
| 2014/0316586 A1 | 10/2014 | Boesveld et al. |
| 2014/0316587 A1 | 10/2014 | Imes et al. |
| 2014/0317029 A1 | 10/2014 | Matsuoka et al. |
| 2014/0319231 A1 | 10/2014 | Matsuoka et al. |
| 2014/0319236 A1 | 10/2014 | Novotny et al. |
| 2014/0320282 A1 | 10/2014 | Zhang |
| 2014/0321011 A1 | 10/2014 | Bisson et al. |
| 2014/0324232 A1 | 10/2014 | Modi et al. |
| 2014/0330435 A1 | 11/2014 | Stoner et al. |
| 2014/0346239 A1 | 11/2014 | Fadell et al. |
| 2014/0358295 A1 | 12/2014 | Warren et al. |
| 2014/0367475 A1 | 12/2014 | Fadell et al. |
| 2014/0376405 A1 | 12/2014 | Erickson et al. |
| 2014/0376530 A1 | 12/2014 | Erickson et al. |
| 2014/0376747 A1 | 12/2014 | Mullet et al. |
| 2015/0001361 A1 | 1/2015 | Gagne et al. |
| 2015/0002165 A1 | 1/2015 | Juntunen et al. |
| 2015/0016443 A1 | 1/2015 | Erickson et al. |
| 2015/0025693 A1 | 1/2015 | Wu et al. |
| 2015/0039137 A1 | 2/2015 | Perry et al. |
| 2015/0041551 A1 | 2/2015 | Tessier et al. |
| 2015/0043615 A1 | 2/2015 | Steinberg et al. |
| 2015/0045976 A1 | 2/2015 | Li |
| 2015/0046162 A1 | 2/2015 | Aley-Raz et al. |
| 2015/0050922 A1 | 2/2015 | Ramalingam et al. |
| 2015/0052253 A1 | 2/2015 | Johnson et al. |
| 2015/0052258 A1 | 2/2015 | Johnson et al. |
| 2015/0053779 A1 | 2/2015 | Adamek et al. |
| 2015/0053780 A1 | 2/2015 | Nelson et al. |
| 2015/0053781 A1 | 2/2015 | Nelson et al. |
| 2015/0058779 A1 | 2/2015 | Bruck et al. |
| 2015/0061859 A1 | 3/2015 | Matsuoka et al. |
| 2015/0066215 A1 | 3/2015 | Buduri |
| 2015/0066216 A1 | 3/2015 | Ramachandran |
| 2015/0066220 A1 | 3/2015 | Sloo et al. |
| 2015/0081106 A1 | 3/2015 | Buduri |
| 2015/0081109 A1 | 3/2015 | Fadell et al. |
| 2015/0081568 A1 | 3/2015 | Land, III |
| 2015/0082225 A1 | 3/2015 | Shearer |
| 2015/0088272 A1 | 3/2015 | Drew |
| 2015/0088318 A1 | 3/2015 | Amundson et al. |
| 2015/0088442 A1 | 3/2015 | Farrar et al. |
| 2015/0088982 A1 | 3/2015 | Johnson et al. |
| 2015/0096876 A1 | 4/2015 | Mittleman et al. |
| 2015/0100166 A1 | 4/2015 | Baynes et al. |
| 2015/0100167 A1 | 4/2015 | Sloo et al. |

(56) References Cited

U.S. PATENT DOCUMENTS

| | | |
|---|---|---|
| 2015/0115045 A1 | 4/2015 | Tu et al. |
| 2015/0115046 A1 | 4/2015 | Warren et al. |
| 2015/0124853 A1 | 5/2015 | Huppi et al. |
| 2015/0127176 A1 | 5/2015 | Bergman et al. |
| 2015/0140994 A1 | 5/2015 | Partheesh et al. |
| 2015/0142180 A1 | 5/2015 | Matsuoka et al. |
| 2015/0144706 A1 | 5/2015 | Robideau et al. |
| 2015/0145653 A1 | 5/2015 | Katingari et al. |
| 2015/0148963 A1 | 5/2015 | Klein et al. |
| 2015/0153057 A1 | 6/2015 | Matsuoka et al. |
| 2015/0153060 A1 | 6/2015 | Stefanski et al. |
| 2015/0156631 A1 | 6/2015 | Ramachandran |
| 2015/0159893 A1 | 6/2015 | Daubman et al. |
| 2015/0159899 A1 | 6/2015 | Bergman et al. |
| 2015/0159902 A1 | 6/2015 | Quam et al. |
| 2015/0159903 A1 | 6/2015 | Marak et al. |
| 2015/0159904 A1 | 6/2015 | Barton |
| 2015/0160691 A1 | 6/2015 | Kadah et al. |
| 2015/0163945 A1 | 6/2015 | Barton et al. |
| 2015/0167995 A1 | 6/2015 | Fadell et al. |
| 2015/0168002 A1 | 6/2015 | Plitkins et al. |
| 2015/0168003 A1 | 6/2015 | Stefanski et al. |
| 2015/0168933 A1 | 6/2015 | Klein et al. |
| 2015/0170171 A1 | 6/2015 | McCurnin et al. |
| 2015/0176854 A1 | 6/2015 | Butler et al. |
| 2015/0176855 A1 | 6/2015 | Geadelmann et al. |
| 2015/0198346 A1 | 7/2015 | Vedpathak |
| 2015/0198347 A1 | 7/2015 | Tessier et al. |
| 2015/0204558 A1 | 7/2015 | Sartain et al. |
| 2015/0204561 A1 | 7/2015 | Sadwick et al. |
| 2015/0204563 A1 | 7/2015 | Imes et al. |
| 2015/0204564 A1 | 7/2015 | Shah |
| 2015/0204565 A1 | 7/2015 | Amundson et al. |
| 2015/0204569 A1 | 7/2015 | Lorenz et al. |
| 2015/0204570 A1 | 7/2015 | Adamik et al. |
| 2015/0205310 A1 | 7/2015 | Amundson et al. |
| 2015/0219357 A1 | 8/2015 | Stefanski et al. |
| 2015/0233594 A1 | 8/2015 | Abe et al. |
| 2015/0233595 A1 | 8/2015 | Fadell et al. |
| 2015/0233596 A1 | 8/2015 | Warren et al. |
| 2015/0234369 A1 | 8/2015 | Wen et al. |
| 2015/0241078 A1 | 8/2015 | Matsuoka et al. |
| 2015/0241860 A1 | 8/2015 | Raid |
| 2015/0245189 A1 | 8/2015 | Nalluri et al. |
| 2015/0248118 A1 | 9/2015 | Li et al. |
| 2015/0249605 A1 | 9/2015 | Erickson et al. |
| 2015/0260424 A1 | 9/2015 | Fadell et al. |
| 2015/0267935 A1 | 9/2015 | Devenish et al. |
| 2015/0268652 A1 | 9/2015 | Lunacek et al. |
| 2015/0276237 A1 | 10/2015 | Daniels et al. |
| 2015/0276238 A1 | 10/2015 | Matsuoka et al. |
| 2015/0276239 A1 | 10/2015 | Fadell et al. |
| 2015/0276254 A1 | 10/2015 | Nemcek et al. |
| 2015/0276266 A1 | 10/2015 | Warren et al. |
| 2015/0277463 A1 | 10/2015 | Hazzard et al. |
| 2015/0277492 A1 | 10/2015 | Chau et al. |
| 2015/0280935 A1 | 10/2015 | Poplawski et al. |
| 2015/0287310 A1 | 10/2015 | Deiiuliis et al. |
| 2015/0292764 A1 | 10/2015 | Land et al. |
| 2015/0292765 A1 | 10/2015 | Matsuoka et al. |
| 2015/0293541 A1 | 10/2015 | Fadell et al. |
| 2015/0294540 A1 | 10/2015 | Hori |
| 2015/0300672 A1 | 10/2015 | Fadell et al. |
| 2015/0304484 A1 | 10/2015 | Halmstad et al. |
| 2015/0312696 A1 | 10/2015 | Ribbich et al. |
| 2015/0316285 A1 | 11/2015 | Clifton et al. |
| 2015/0316286 A1 | 11/2015 | Roher |
| 2015/0316902 A1 | 11/2015 | Wenzel et al. |
| 2015/0323212 A1 | 11/2015 | Warren et al. |
| 2015/0327010 A1 | 11/2015 | Gottschalk et al. |
| 2015/0327084 A1 | 11/2015 | Ramachandran et al. |
| 2015/0327375 A1 | 11/2015 | Bick et al. |
| 2015/0330654 A1 | 11/2015 | Matsuoka |
| 2015/0330658 A1 | 11/2015 | Filson et al. |
| 2015/0330660 A1 | 11/2015 | Filson et al. |
| 2015/0332150 A1 | 11/2015 | Thompson |
| 2015/0338117 A1 | 11/2015 | Henneberger et al. |
| 2015/0345818 A1 | 12/2015 | Oh et al. |
| 2015/0348554 A1 | 12/2015 | Orr et al. |
| 2015/0354844 A1 | 12/2015 | Kates |
| 2015/0354846 A1 | 12/2015 | Hales et al. |
| 2015/0355371 A1 | 12/2015 | Ableitner et al. |
| 2015/0362208 A1 | 12/2015 | Novotny et al. |
| 2015/0362926 A1 | 12/2015 | Yarde et al. |
| 2015/0362927 A1 | 12/2015 | Giorgi |
| 2015/0364135 A1 | 12/2015 | Kolavennu et al. |
| 2015/0370270 A1 | 12/2015 | Pan et al. |
| 2015/0370272 A1 | 12/2015 | Reddy et al. |
| 2015/0370615 A1 | 12/2015 | Pi-Sunyer |
| 2015/0370621 A1 | 12/2015 | Karp et al. |
| 2015/0372832 A1 | 12/2015 | Kortz et al. |
| 2015/0372834 A1 | 12/2015 | Karp et al. |
| 2015/0372999 A1 | 12/2015 | Pi-Sunyer |
| 2016/0006274 A1 | 1/2016 | Tu et al. |
| 2016/0006577 A1 | 1/2016 | Logan |
| 2016/0010880 A1 | 1/2016 | Bravard et al. |
| 2016/0018122 A1 | 1/2016 | Frank et al. |
| 2016/0018127 A1 | 1/2016 | Gourlay et al. |
| 2016/0020590 A1 | 1/2016 | Roosli et al. |
| 2016/0026194 A1 | 1/2016 | Mucignat et al. |
| 2016/0036227 A1 | 2/2016 | Schultz et al. |
| 2016/0040903 A1 | 2/2016 | Emmons et al. |
| 2016/0047569 A1 | 2/2016 | Fadell et al. |
| 2016/0054022 A1 | 2/2016 | Matas et al. |
| 2016/0054792 A1 | 2/2016 | Poupyrev |
| 2016/0054988 A1 | 2/2016 | Desire |
| 2016/0061471 A1 | 3/2016 | Eicher et al. |
| 2016/0061474 A1 | 3/2016 | Cheung et al. |
| 2016/0069582 A1 | 3/2016 | Buduri |
| 2016/0069583 A1 | 3/2016 | Fadell et al. |
| 2016/0073482 A1 | 3/2016 | Fok et al. |
| 2016/0077532 A1 | 3/2016 | Lagerstedt et al. |
| 2016/0087933 A1 | 3/2016 | Johnson et al. |
| 2016/0088041 A1 | 3/2016 | Nichols |
| 2016/0107820 A1 | 4/2016 | Macvittie et al. |
| 2016/0112262 A1 | 4/2016 | Johnson et al. |
| 2016/0116181 A1 | 4/2016 | Aultman et al. |
| 2016/0131382 A1 | 5/2016 | Rosen |
| 2016/0138819 A1 | 5/2016 | Vega |
| 2016/0171289 A1 | 6/2016 | Lee et al. |
| 2016/0180663 A1 | 6/2016 | McMahan et al. |
| 2016/0187023 A1 | 6/2016 | Bevan et al. |
| 2016/0215960 A1* | 7/2016 | Gelonese .................. F21K 9/62 |
| 2016/0223216 A1 | 8/2016 | Buda et al. |
| 2016/0249437 A1 | 8/2016 | Sun et al. |
| 2016/0261425 A1 | 9/2016 | Horton et al. |
| 2016/0287166 A1 | 10/2016 | Tran |
| 2016/0327298 A1 | 11/2016 | Sinha et al. |
| 2016/0327299 A1 | 11/2016 | Ribbich et al. |
| 2016/0327300 A1 | 11/2016 | Ribbich et al. |
| 2016/0327301 A1 | 11/2016 | Ribbich et al. |
| 2016/0327302 A1 | 11/2016 | Ribbich et al. |
| 2016/0327921 A1 | 11/2016 | Ribbich et al. |
| 2016/0330084 A1 | 11/2016 | Hunter et al. |
| 2016/0344745 A1 | 11/2016 | Johnson et al. |
| 2016/0365885 A1 | 12/2016 | Honjo et al. |
| 2016/0377306 A1 | 12/2016 | Drees et al. |
| 2017/0041454 A1 | 2/2017 | Nicholls et al. |
| 2017/0059197 A1 | 3/2017 | Goyal et al. |
| 2017/0074536 A1 | 3/2017 | Bentz et al. |
| 2017/0074537 A1 | 3/2017 | Bentz et al. |
| 2017/0074539 A1 | 3/2017 | Bentz et al. |
| 2017/0074541 A1 | 3/2017 | Bentz et al. |
| 2017/0075510 A1 | 3/2017 | Bentz et al. |
| 2017/0075568 A1 | 3/2017 | Bentz et al. |
| 2017/0076263 A1 | 3/2017 | Bentz et al. |
| 2017/0085514 A1 | 3/2017 | Burrus et al. |
| 2017/0102162 A1 | 4/2017 | Drees et al. |
| 2017/0102433 A1 | 4/2017 | Wenzel et al. |
| 2017/0102434 A1 | 4/2017 | Wenzel et al. |
| 2017/0102675 A1 | 4/2017 | Drees |
| 2017/0102723 A1 | 4/2017 | Smith et al. |
| 2017/0103483 A1 | 4/2017 | Drees et al. |
| 2017/0104332 A1 | 4/2017 | Wenzel et al. |

(56) References Cited

U.S. PATENT DOCUMENTS

| | | |
|---|---|---|
| 2017/0104336 A1 | 4/2017 | Elbsat et al. |
| 2017/0104337 A1 | 4/2017 | Drees |
| 2017/0104342 A1 | 4/2017 | EBSat et al. |
| 2017/0104343 A1 | 4/2017 | Elbsat et al. |
| 2017/0104344 A1 | 4/2017 | Wenzel et al. |
| 2017/0104345 A1 | 4/2017 | Wenzel et al. |
| 2017/0104346 A1 | 4/2017 | Wenzel et al. |
| 2017/0104449 A1 | 4/2017 | Drees |
| 2017/0122613 A1 | 5/2017 | Sinha et al. |
| 2017/0122617 A1 | 5/2017 | Sinha et al. |
| 2017/0123391 A1 | 5/2017 | Sinha et al. |
| 2017/0124838 A1 | 5/2017 | Sinha et al. |
| 2017/0124842 A1 | 5/2017 | Sinha et al. |
| 2017/0131825 A1 | 5/2017 | Moore et al. |
| 2017/0192402 A1 | 7/2017 | Karp et al. |
| 2017/0263111 A1 | 9/2017 | Deluliis et al. |
| 2017/0272316 A1 | 9/2017 | Johnson et al. |
| 2017/0292731 A1 | 10/2017 | Matsuoka et al. |
| 2017/0295058 A1 | 10/2017 | Gottschalk et al. |
| 2017/0357607 A1 | 12/2017 | Cayemberg et al. |
| 2018/0023833 A1 | 1/2018 | Matsuoka et al. |
| 2018/0087795 A1 | 3/2018 | Okita et al. |
| 2018/0088605 A1 | 3/2018 | Matsuoka et al. |
| 2018/0123821 A1 | 5/2018 | Alberth, Jr. |
| 2018/0124178 A1 | 5/2018 | Alberth, Jr. |
| 2018/0181919 A1 | 6/2018 | Jobling et al. |
| 2018/0262388 A1 | 9/2018 | Johnson et al. |
| 2018/0266718 A1 | 9/2018 | Gillette et al. |
| 2018/0314416 A1* | 11/2018 | Powderly ............ G06F 3/04847 |
| 2019/0208095 A1 | 7/2019 | Kraz et al. |

FOREIGN PATENT DOCUMENTS

| | | |
|---|---|---|
| CA | 2633121 C | 8/2011 |
| CA | 2818356 | 5/2012 |
| CA | 2818696 A1 | 5/2012 |
| CA | 2853041 | 4/2013 |
| CA | 2853081 A1 | 4/2013 |
| CA | 2812567 | 5/2014 |
| CA | 2886531 A1 | 9/2015 |
| CA | 2894359 A1 | 12/2015 |
| CN | 1882894 | 12/2006 |
| CN | 1918762 | 2/2007 |
| CN | 200979666 | 11/2007 |
| CN | 102119507 | 7/2011 |
| CN | 102314289 A | 1/2012 |
| CN | 202126052 | 1/2012 |
| CN | 203705984 | 7/2014 |
| CN | 104020726 A | 9/2014 |
| CN | 203907883 | 10/2014 |
| CN | 204116988 | 1/2015 |
| DE | 10 2004 005 962 A1 | 8/2005 |
| EP | 2 283 279 A2 | 2/2011 |
| EP | 2 738 478 A2 | 6/2014 |
| EP | 2 897 018 A1 | 7/2015 |
| EP | 2 988 188 A2 | 2/2016 |
| GB | 2 519 441 A | 4/2015 |
| JP | H09-126523 A | 5/1997 |
| JP | H10-276483 A | 10/1998 |
| JP | 2007-218499 A | 8/2007 |
| JP | 2011-014516 A | 1/2011 |
| JP | 2015-500974 A | 1/2015 |
| WO | WO-00/22491 A1 | 4/2000 |
| WO | WO-2006/041599 A9 | 7/2006 |
| WO | WO-2009/006133 A1 | 1/2009 |
| WO | WO-2009/036764 A3 | 3/2009 |
| WO | WO-2009/058127 A1 | 5/2009 |
| WO | WO-2010/059143 A1 | 5/2010 |
| WO | WO-2010/078459 A1 | 7/2010 |
| WO | WO-2010/088663 A1 | 8/2010 |
| WO | WO-2012/042232 A3 | 4/2012 |
| WO | WO-2012/068436 A1 | 5/2012 |
| WO | WO-2012/068437 A3 | 5/2012 |
| WO | WO-2012/068459 A3 | 5/2012 |
| WO | WO-2012/068495 A1 | 5/2012 |
| WO | WO-2012/068503 A1 | 5/2012 |
| WO | WO-2012/068507 A3 | 5/2012 |
| WO | WO-2012/068517 A1 | 5/2012 |
| WO | WO-2012/068526 A1 | 5/2012 |
| WO | WO-2012/142477 A3 | 10/2012 |
| WO | WO-2013/033469 A1 | 3/2013 |
| WO | WO-2013/052389 A1 | 4/2013 |
| WO | WO-2013/052901 A3 | 4/2013 |
| WO | WO-2013/052905 A1 | 4/2013 |
| WO | WO-2013/058932 | 4/2013 |
| WO | WO-2013/058933 A1 | 4/2013 |
| WO | WO-2013/058934 | 4/2013 |
| WO | WO-2013/058968 A1 | 4/2013 |
| WO | WO-2013/058969 A1 | 4/2013 |
| WO | WO-2013/059684 A1 | 4/2013 |
| WO | WO-2013/153480 A3 | 10/2013 |
| WO | WO-2014/047501 A1 | 3/2014 |
| WO | WO-2014/051632 A1 | 4/2014 |
| WO | WO-2014/051635 A1 | 4/2014 |
| WO | WO-2014/055059 A1 | 4/2014 |
| WO | WO-2014/152301 A2 | 9/2014 |
| WO | WO-2014/152301 A3 | 9/2014 |
| WO | WO-2015/012449 A1 | 1/2015 |
| WO | WO-2015/039178 A1 | 3/2015 |
| WO | WO-2015/054272 A2 | 4/2015 |
| WO | WO-2015/057698 A1 | 4/2015 |
| WO | WO-2015/099721 A1 | 7/2015 |
| WO | WO-2015/127499 A1 | 9/2015 |
| WO | WO-2015/127566 A1 | 9/2015 |
| WO | WO-2015/134755 A3 | 9/2015 |
| WO | WO-2015/195772 A1 | 12/2015 |
| WO | WO-2016/038374 A1 | 3/2016 |
| WO | WO-2017/044903 A1 | 3/2017 |

OTHER PUBLICATIONS

Hayashi et al: "Wave to Me: Human Factors in Computing Systems", ACM, 2 Penn Plaza, Suite 701 New York, NY 10121-0701 USA, Apr. 26, 2014, pp. 3453-3462.
International Search Report and Written Opinion for Application No. PCT/US2016/030291, mail date Sep. 7, 2016, 11 pages.
International Search Report and Written Opinion for Application No. PCT/US2016/030827, mail date Sep. 7, 2016, 13 pages.
International Search Report and Written Opinion for Application No. PCT/US2016/030829, mail date Sep. 7, 2016, 15 pages.
International Search Report and Written Opinion for Application No. PCT/US2016/030835, mail date Sep. 7, 2016, 13 pages.
International Search Report and Written Opinion for Application No. PCT/US2016/030836, mail date Sep. 7, 2016, 11 pages.
International Search Report and Written Opinion for Application No. PCT/US2016/030837, mail date Sep. 7, 2016, 13 pages.
International Search Report and Written Opinion for Application No. PCT/US2016/051176, mail date Feb. 16, 2017, 20 pages.
International Search Report and Written Opinion for Application No. PCT/US2017/012218, mail date Mar. 31, 2017, 14 pages.
International Search Report and Written Opinion for Application No. PCT/US2017/012221, mail date Mar. 31, 2017, 13 pages.
International Search Report and Written Opinion for Application No. PCT/US2017/030890, mail date Jun. 21, 2017, 13 pages.
International Search Report and Written Opinion for Application No. PCT/US2017/054915, mail date Jan. 16, 2018, 14 pages.
International Search Report and Written Opinion for Application PCT/US2017/012217, mail date Mar. 31, 2017, 14 pages.
Johnson Controls Technology Company's Complaint for Patent Infringement. Case 1:20-cv-03692-LMM. United States District Court for the Northern District of Georgia. filed Sep. 9, 2020. 23 pages.
National Semiconductor's Temperature Sensor Handbook, Dated Nov. 1, 1997, pp. 1-40.
Office Action on CN 201680037294.2, dated Aug. 2, 2019, 27 pages with English translation.
Office Action on CN 201680038068.6, dated Aug. 12, 2019, 16 pages with English translation.
Office Action on CN 201780005745.9, dated Aug. 25, 2020, 8 pages with English language translation.

(56) References Cited

OTHER PUBLICATIONS

Office Action on CN 201780005745.9, dated Dec. 4, 2019, 24 pages with English translation.
Office Action on IN 201727040519, dated Dec. 27, 2019, 6 pages.
Office Action on NZ 737432, dated Jan. 31, 2019, 5 pages.
PCT Int'l Preliminary Report on Patentability dated Nov. 15, 2018 for Appl. No. PCT/US2017/030890.
Second Written Opinion for Singapore Application No. 11201708997W, dated Dec. 6, 2018, 6 pages.
Unknown, National Semiconductor's Temperature Sensor Handbook, Nov. 1, 1997, retrieved from the Internet at http://shrubbery.net/~heas/willem/PDF/NSC/temphb.pdf on Aug. 11, 2016, pp. 1-40.
Written Opinion for Singapore Application No. 11201708996V, mailed Dec. 27, 2017, 6 pages.
Written Opinion for Singapore Application No. 11201708997W, mailed Jan. 10, 2018, 9 pages.
Written Opinion for Singapore Application No. 11201709002Y, mailed Feb. 7, 2018, 5 pages.

\* cited by examiner

DISPLAY DEVICE WITH HALO

CROSS-REFERENCE TO RELATED PATENT APPLICATIONS

This application is a Continuation of U.S. application Ser. No. 16/246,447, filed Jan. 11, 2019, which claims the benefit and priority to U.S. Provisional Application No. 62/783,580, filed Dec. 21, 2018, both of which are incorporated herein by reference in their entireties.

BACKGROUND

The present disclosure relates generally to a display device. More specifically, the present disclosure relates to a display device with improved viewing angles.

SUMMARY

One implementation of the present disclosure is a display device, according to some embodiments. The display device includes a front portion, a rear portion, sides extending between the front portion and the rear portion. In some embodiments, the front portion, the rear portion, and the sides form an enclosure. In some embodiments, the display device includes a halo. The halo includes a rim and an internal structure, according to some embodiments. In some embodiments, the rim is positioned between the front portion and the rear portion. In some embodiments, the internal structure is at least partially within the enclosure and includes a sweep portion and a receiving post. In some embodiments, the receiving post and the sweep portion are configured to receive light emitted by one or more light emitting devices and at least one of guide, direct, diffuse, focus, and scatter light emitted by the one or more light emitting devices out of the display device.

In some embodiments, the halo is configured to at least one of guide, direct, diffuse, focus, and scatter the light emitted by the one or more light emitting devices along or outwards from at least one of the sides of the display device.

In some embodiments, the display device includes a controller configured to adjust at least one of a brightness and a color of at least one of the one or more light emitting devices.

In some embodiments, the sweep portion is generally S-shaped and protrudes at a first end from the rim.

In some embodiments, the receiving post extends from a second end of the sweep portion.

In some embodiments, a width of the sweep portion varies along a path of the sweep portion.

In some embodiments, the width of the sweep portion decreases from the first end of the sweep portion to the second end of the sweep portion. In some embodiments, a final width of the sweep portion is substantially equal to a width of the receiving post.

In some embodiments, the halo is at least one of a translucent and a transparent material and is configured to allow light to pass through.

In some embodiments, the internal structure is positioned within the enclosure formed by the sides, the rear portion, and the front portion. In some embodiments, the rim is positioned between the front portion and the rear portion.

In some embodiments, the front portion includes a display device configured to display information.

In some embodiments, the halo is configured to direct light outwards from the display device such that the light is viewable from a side of the display device.

Another implementation of the present disclosure is an alert system for a monitored condition, according to some embodiments. In some embodiments, the system includes at least one of a sensor, a controller, equipment, and a network, configured to at least one of detect, receive, or transmit information regarding the monitored condition. In some embodiments, the system includes a display device including a front portion and a rear portion. In some embodiments, the display device includes a halo device configured to allow light emitted by one or more light emitting devices to pass through and to direct the light outwards from the display device. In some embodiments, the halo device includes a rim positioned between the front portion and the rear portion, and one or more light guides configured to receive light emitted by the one or more light emitting devices and guide the light out of the display device through the rim. In some embodiments, the system includes a controller configured to receive the information regarding the monitored condition from the at least one of sensor, controller, equipment, or network and adjust one or more operations of one or more of the one or more light emitting devices based on the information regarding the monitored condition. In some embodiments, the light guides include a sweep portion and a receiving post.

In some embodiments, one or more of the light emitting devices are a single color LED, a multi-color LED, a dimmable single color LED, and a dimmable multi-color LED.

In some embodiments, the controller is configured to patterningly adjust at least one of a brightness and a color of one of more of the one or more light emitting devices based the information received.

In some embodiments, the controller is configured to determine if one or more of the variables of the information exceed a threshold value and patterningly adjust one of more of the one or more light emitting devices in response to the one or more variables exceeding the threshold value.

In some embodiments, the light guides are generally S-shaped and include a first end and a second end. In some embodiments, the light guides protrude at the first end from the rim and the second end is proximate one of the one or more light emitting devices.

In some embodiments, the light guides are configured to receive light emitted by one of the light emitting devices at the second end, and guide the light along the light guide and outwards from the display device.

In some embodiments, the halo is configured to diffuse light along one or more surfaces of at least one of the front portion and the rear portion of the display device.

Another implementation of the present disclosure is a side-viewable thermostat for a conditioned space, according to some embodiments. In some embodiments, the thermostat includes one or more light emitting devices, a sensor configured to measure a temperature of the conditioned space, and a light diffusing device. In some embodiments, the light diffusing device includes a rim and a light guiding portion. In some embodiments, the rim is configured to diffuse light emitted by the one or more light emitting devices along one or more sides of the thermostat. In some embodiments, the light guiding portion is configured to guide light emitted by the one or more light emitting devices to the rim. In some embodiments, the thermostat includes a controller. In some embodiments, the controller is configured to receive the temperature of the conditioned space and patterningly adjust at least one of a brightness and a color of one or more of the light emitting devices based on the temperature being greater than or less than a threshold temperature. In some embodiments, the light guiding portion includes a sweep portion and a receiving portion.

In some embodiments, the light guiding portion has a width. In some embodiments, the width varies along a path of the light guiding portion. In some embodiments, the light guiding portion is configured to direct and diffuse light outwards from the thermostat through the rim.

Another implementation of the present disclosure is a display device, according to some embodiments. In some embodiments, the display device includes a front portion and a rear portion. In some embodiments, the display device includes sides extending between the front portion and the rear portion. In some embodiments, the sides, the front portion, and the rear portion form an enclosure. In some embodiments, the display device includes a halo having a rim and an internal structure. In some embodiments, the rim is positioned between the front portion and the rear portion and the internal structure of the halo is at least partially within the enclosure and comprises a sweep portion and a receiving post. In some embodiments, the halo tracks a gradient color of a status bar for consistency with the rest of the display. In some embodiments, the receiving post and the sweep portion are configured to receive light emitted by one or more light emitting devices and at least one of guide, direct, diffuse, focus, and scatter light emitted by the one or more light emitting devices out of the display device.

DETAILED DESCRIPTION

Overview

Figure 1:
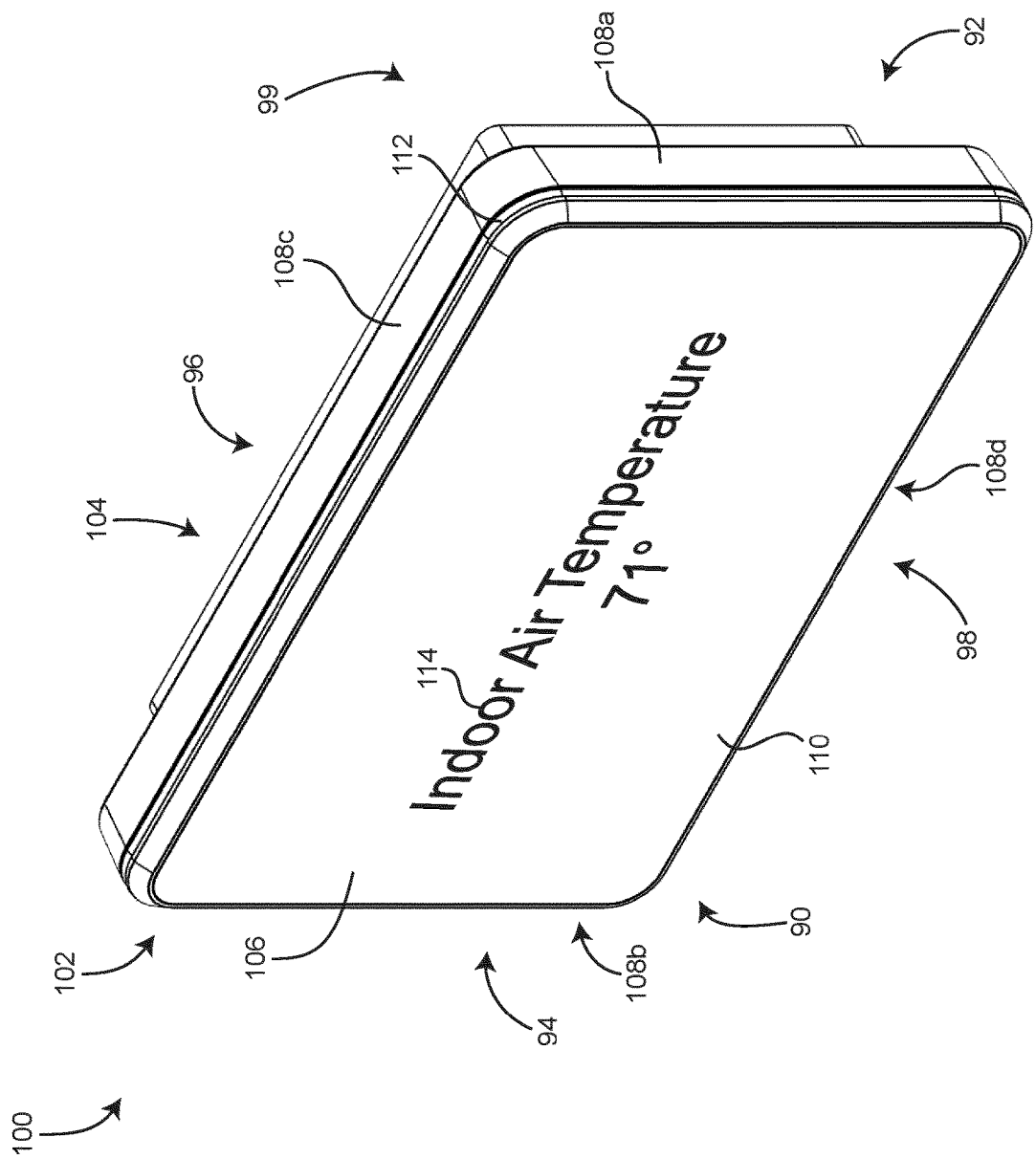
FIG. 1 is an isometric view of a display device, according to some embodiments.

A display device includes a housing having a front portion, a rear portion, and a halo having a rim which is disposed between the front portion and the rear portion, according to some embodiments. In some embodiments, the halo receives light emitted by one or more LEDs and diffuses the light along sides of the display device. The halo includes multiple light guiding portions which each have a receiving post and a sweep portion, according to some embodiments. In some embodiments, each of the light guiding portions protrude from a rim of the halo which is positioned between the front portion and rear portion of the display device. In some embodiments, the halo is made of or includes a translucent material and/or a transparent material. In some embodiments, the LEDs are disposed along a path of an LED board and are each configured to emit light received by a corresponding light guiding portion. In some embodiments, the light guiding portions are cantilever portions, having an overall S-shape, protruding at one end from the rim. In some embodiments, the light guiding portions include exterior surfaces coated (e.g., cladded) with an opaque material which does not allow light to pass through along substantially an entire length of the light guiding portions. In some embodiments, a surface of the receiving posts and an exterior surface of the rim does not include the opaque material, such that light may enter and exit the light guiding portions only at the receiving post and exterior surface of the rim, respectively.

In some embodiments, the halo facilitates notification of a user regarding any of information, a message, an event, etc., at a wider viewing angle. For example, if the user is not positioned directly in front of the display device, the user may be unable to view a front display panel of the display device, according to some embodiments. In some embodiments, the halo directs light outwards from sides of the display device, so that the light emitted by the LEDs can be viewed by a user at a generally side angle.

In some embodiments, the display device is a thermostat. In some embodiments, the display device is configured to receive information from any of a sensor, another controller, a network, etc. In some embodiments, the display device is configured to patterningly adjust an operation of one or more of the LEDs (e.g., which LEDs switch on/off, when certain LEDs switch on/off, a brightness of one or more of the LEDs, a color of one or more of the LEDs, etc.) to provide unique visual notifications to the user. In some embodiments, the display device includes a controller configured to determine patterned operations of the LEDs to produce the unique visual notifications. In some embodiments, the display device is a general display device and may be used for a variety of applications (e.g., building systems, security systems, reminder systems, emergency exit systems, fire alarm systems, indoor air quality systems, automotive systems, alarm systems, intrusion detection systems, etc.).

Advantageously, the display device facilitates visual notification regarding a variable, an event, a change in a variable, etc., to a user at a wider viewing angle, according to some embodiments.

Display Device

Overview

Referring now to FIG. 1, display device 100 is shown, according to some embodiments. Display device 100 is shown to include a front 90, a left side 92, a right side 94, a top 96, a bottom 98, and a rear 99, according to some embodiments. In some embodiments, display device 100 is configured to be a wall-mounted display device. In some embodiments, display device 100 includes a mounting portion configured to mount display device 100 to a wall. In some embodiments, display device 100 is configured to be at least partially received by the wall. In some embodiments, display device 100 includes a flat portion configured to facilitate mounting of display device 100. In some embodiments, display device 100 is configured to sit (e.g., rest, lay, be adjacent to, etc.) a surface (e.g., a face, a table, a top surface of equipment, etc.). In some embodiments, display device 100 is configured to display any of sensor information, equipment information, controller information, messages, alerts, etc., shown as display information 114, to a user. Display device 100 is configured to facilitate an alert or a message to a user based on information received from any of equipment, a controller, a sensor, a remote server, etc., according to some embodiments. In some embodiments, display device 100 is configured to provide an alert to a user via user interface 106. In some embodiments, user interface 106 is or includes any of an LCD screen, an LED screen, a resistive touch screen, a surface capacitive touch screen, a projected capacitive touch screen, a surface acoustic wave touch screen, an infrared touch screen, etc. In some embodiments, user interface 106 includes one or more buttons. In some embodiments, user interface 106 is configured to receive an input from a user (e.g., through any of a touchscreen, one or more buttons, a wireless device, etc.) and provide the input to any of a controller, equipment, etc. In some embodiments, the input adjusts a display of user interface 106. For example, the input may indicate an adjustment of an LEDs (e.g., brightness, color, pattern, etc.), of display device 100, according to some embodiments. In some embodiments, the input adjusts information, alerts, data, etc., displayed by user interface 106. For example, the input from the user may transition user interface 106 from displaying a first message (e.g., a time of day) to displaying a second message (e.g., a date), according to some embodiments. In some embodiments, user interface 106 displays one or more environmental conditions (e.g., temperature, pressure, indoor air quality, etc.) of a space. In some embodiments, the space which user interface 106 displays information regarding is a space within which display device 100 is positioned. In some embodiments, the space which user interface 106 displays information regarding is another space which display device 100 is not positioned within. In some embodiments, user interface 106 displays one or more environmental conditions of one or more spaces (e.g., the space which display device 100 is positioned within, a second space, a third space, etc.). In some embodiments, user interface 106 displays information (e.g., environmental condition information) regarding various rooms of a building.

In some embodiments, user interface 106 transitions between a set of predetermined messages/alerts/information. For example, user interface 106 may iteratively display an indoor air temperature, an indoor air quality, an outdoor air temperature, a time of day, an alert, etc. In some embodiments, user interface 106 transitions from displaying one message/information/alert at an end of a predetermined time period. For example, user interface 106 may display a different message/information/alert every 1 second, every 5 seconds, etc., upon a request received from the user through user interface 106, or upon an event (e.g., an alert), according to some embodiments.

Display device 100 includes a front portion 102 and a rear portion 104, according to some embodiments. In some embodiments, front portion 102 and rear portion 104 are coupled (e.g., removably coupled, fixedly coupled, selectively coupled, fastened, integrally formed, etc.) to each other. In some embodiments, front portion 102 and rear portion 104 are removably coupled (e.g., by fasteners). In some embodiments, front portion 102 and rear portion 104 are configured to interface with each other (e.g., a slip fit, a frictional fit, a snap fit, etc.). In some embodiments, front portion 102 and rear portion 104 use a combination of fasteners and an interfaced fit (e.g., a slip fit, a frictional fit, a snap fit, etc.).

In some embodiments, front portion 102 includes user interface 106. In some embodiments, front portion 102 includes an aperture (e.g., an opening, a hole, a recess, etc.) configured to receive user interface 106 therein. In some embodiments, front portion 102 includes a covering 110 configured to interface with front portion 102. In some embodiments, covering 110 is a protective covering configured to protect user interface 106 from damage. In some embodiments, covering 110 is disposed in front of user interface 106. Covering 110 may be any of a glass material, a plastic material, etc. In some embodiments, covering 110 is translucent. In some embodiments, covering 110 is transparent. In some embodiments, covering 110 is configured to allow light emitted by user interface 106 to pass through.

Covering 110 is disposed outside of front portion 102, according to some embodiments. In some embodiments, covering 110 is disposed adjacent an inner surface of front portion 102. In some embodiments, covering 110 covers at least part of or an entire area of the aperture of front portion 102 which receives user interface 106. In some embodiments, covering 110 is received in an aperture (e.g., an opening, a hole, a recess, etc.) of front portion 102. In some embodiments, covering 110 is received within the aperture within which user interface 106 is received.

In some embodiments, sides 108 (e.g., walls, borders, faces, surfaces, panels, etc.) are disposed between front portion 102 and rear portion 104. In some embodiments, sides 108 extend between rear portion 104 and front portion 102. In some embodiments, any of sides 108 are integrally formed with at one of front portion 102 and rear portion 104. For example, in some embodiments, sides 108 are integrally formed with front portion 102. In some embodiments, sides 108 are integrally formed with rear portion 104. In some embodiments, one or more of sides 108 are integrally formed with one of front portion 102 or rear portion 104, while one or more other sides 108 are integrally formed with another of front portion 102 or rear portion 104. For example, left side 108a and right side 108b are integrally formed with front portion 102 and upper side 108c and bottom side 108d are integrally formed with rear portion 104 (or vice versa), according to some embodiments.

In some embodiments, sides 108 are coupled (e.g., removably coupled, attached, fastened, fixed, slip fit, frictionally fit, snap fit, etc.) to at least one of front portion 102 and rear portion 104. In some embodiments, sides 108, front portion 102, and rear portion 104 define an enclosure having an inner volume therein. In some embodiments, any of user interface 106, a controller, a power circuit, etc., or any other components, subcomponents or devices (e.g., LEDs) are disposed within the inner volume defined by front portion 102, rear portion 104 and sides 108.

In some embodiments, sides 108 are generally planar. For example, as shown in FIG. 1, sides 108 are generally flat surfaces extending between front portion 102 and rear portion 104, according to some embodiments. In some embodiments, sides 108 are slanted at an angle. In some embodiments, sides 108 have an arcuate curvature. In some embodiments, sides 108 are generally curved and have a non-constant radius of curvature.

Opposite sides 108 are substantially parallel to each other, according to some embodiments. For example, left side 108a is shown generally parallel to right side 108b and upper side 108c is generally parallel to bottom side 108d, according to some embodiments. In some embodiments, opposite sides 108 are not parallel to each other. For example, in some embodiments, left side 108a non-parallel with right side 108b. In some embodiments, adjacent sides 108 are substantially perpendicular to each other. For example, as shown in FIG. 1, left side 108a is substantially perpendicular to upper side 108c (which is adjacent left side 108a), according to some embodiments. In some embodiments, left side 108a is substantially perpendicular to bottom side 108d. In some embodiments, left side 108a, right side 108b, upper side 108c, and bottom side 108d are integrally formed with each other.

In some embodiments, a halo 112 is positioned between front portion 102 and rear portion 104. In some embodiments, halo 112 is positioned between sides 108 and one of front portion 102 and rear portion 104. For example, as shown in FIG. 1, sides 108 are integrally formed with rear portion 104, and halo 112 is positioned between rear portion 104/sides 108 and front portion 102, according to some embodiments. In some embodiments, halo 112 is configured to any of diffuse, direct, guide, focus, scatter, etc., light emitted by one or more LEDs. In some embodiments, halo 112 facilitates light emission, diffusion, direction, guidance, focusing, scattering, outwards along and/or outwards from display device 100. For example, in some embodiments, halo 112 diffuses light emitted by one or more LEDs in one or more directions generally normal to sides 108. In some embodiments, halo 112 facilitates a wider viewing angle of the light emitted by the one or more LEDs to provide an alert to an observer.

Figure 2:
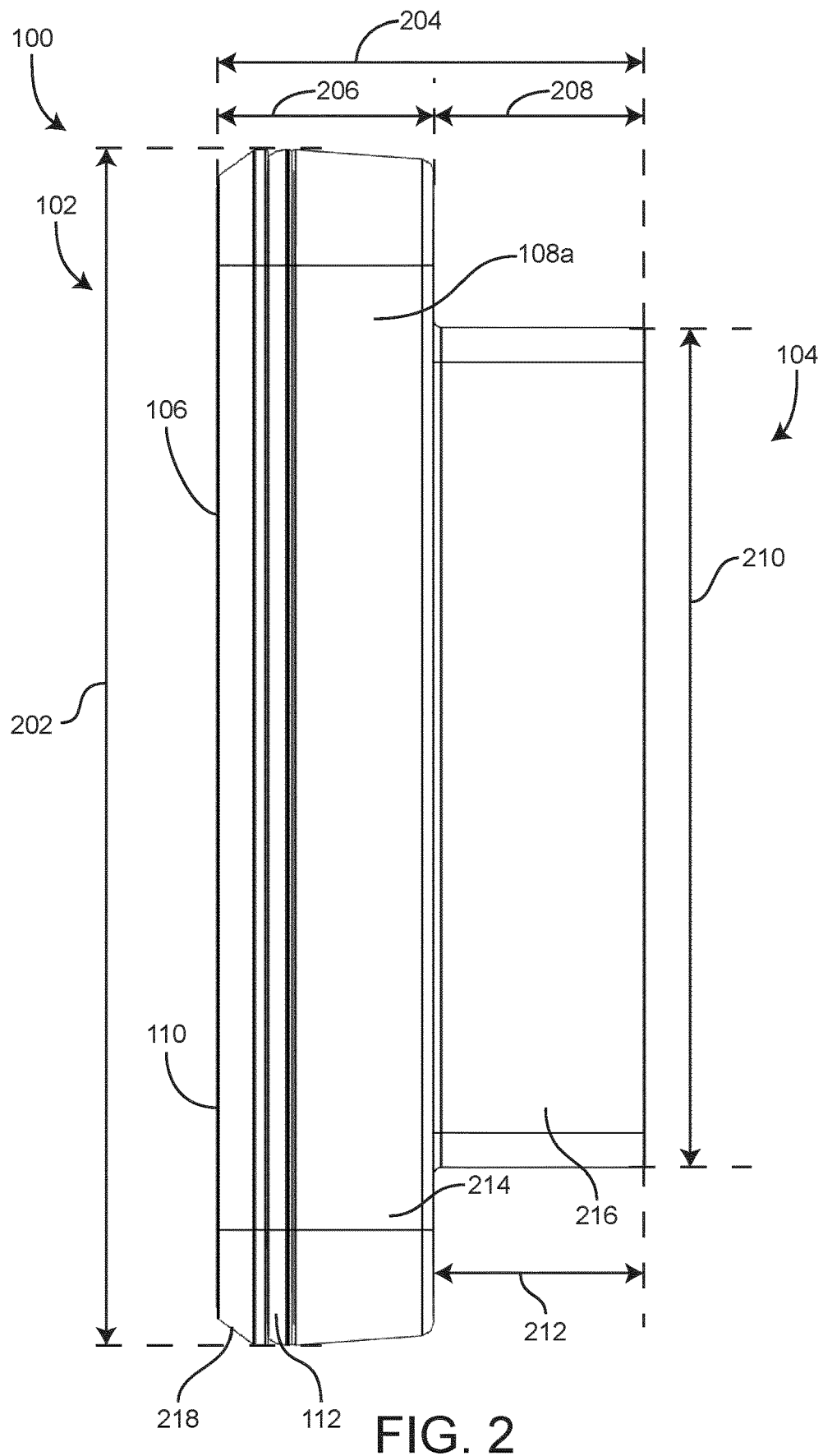
FIG. 2 is a side view of the display device of FIG. 1, according to some embodiments.
Figure 3:
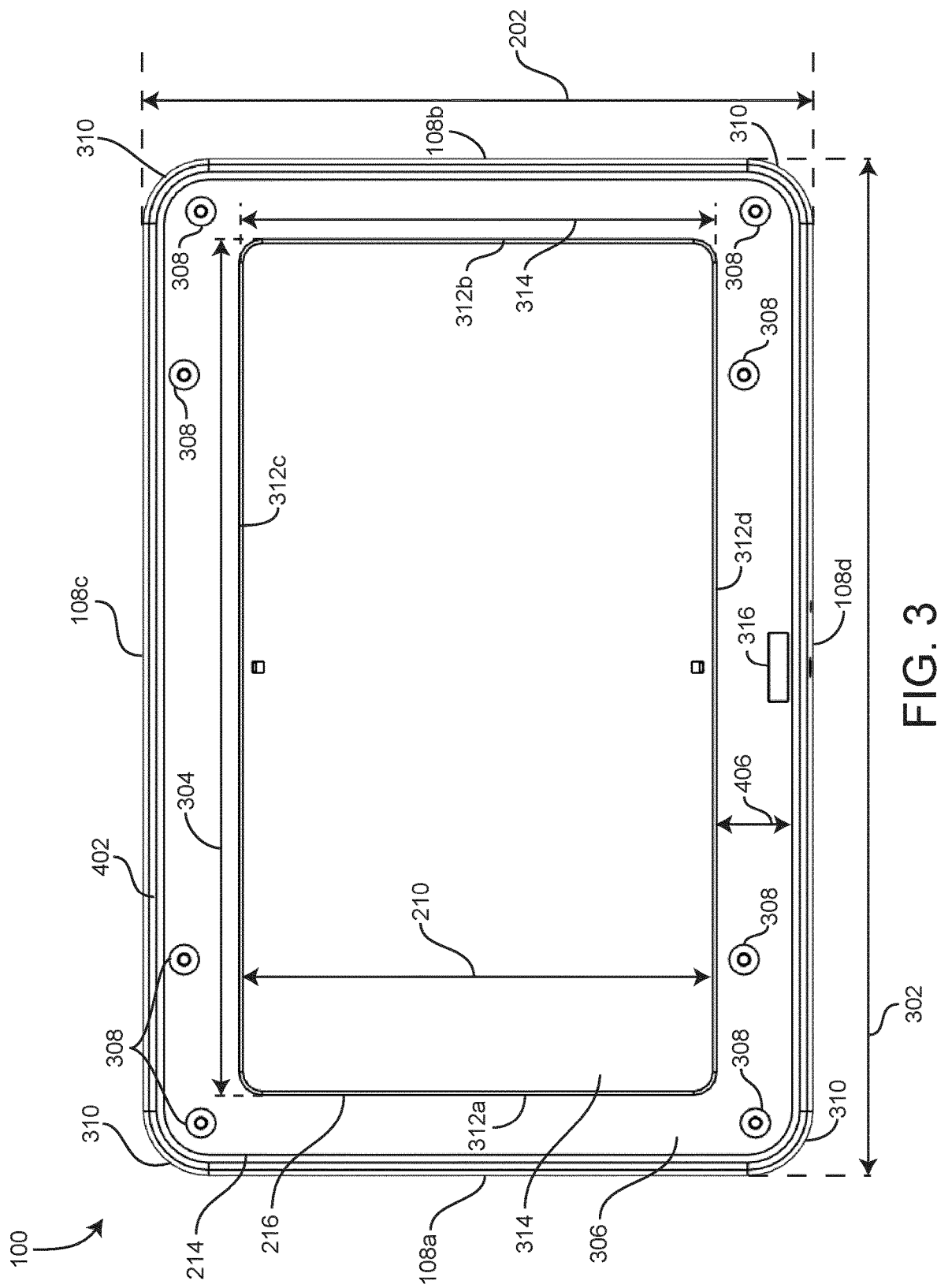
FIG. 3 is a rear view of the display device of FIG. 1, according to some embodiments.
Figure 4:
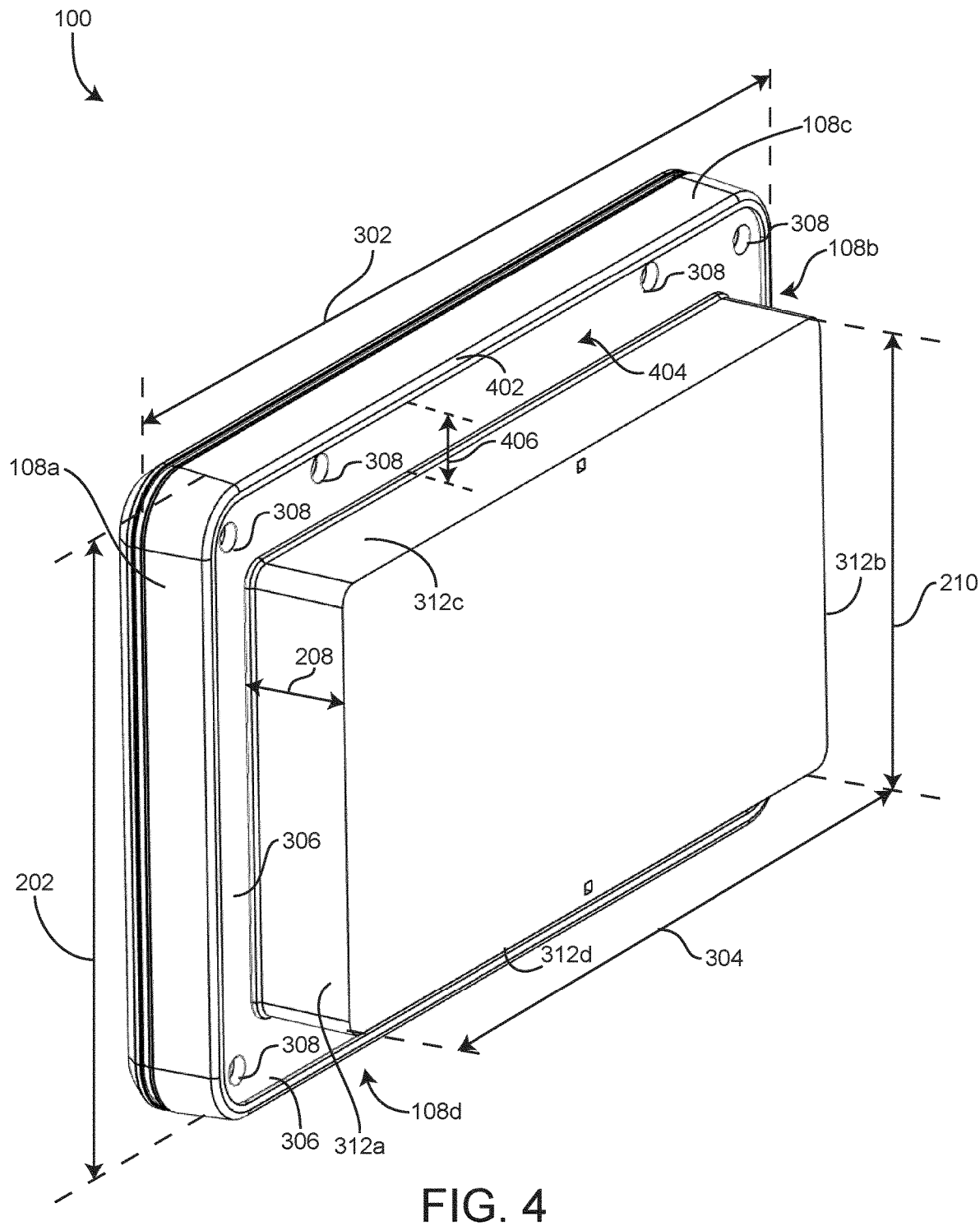
FIG. 4 is a rear elevated view of the display device of FIG. 1, according to some embodiments.

Referring now to FIGS. 2-4, display device 100 is shown in greater detail, according to some embodiments. In some embodiments, display device 100 has an overall height 202. In some embodiments, an overall height of front portion 102 is substantially equal to height 202. In some embodiments, height 202 is a distance from a bottom-most edge (e.g., bottom side 108d) and an upper-most edge (e.g., upper side 108c). In some embodiments, height 202 is an average height of display device 100. In some embodiments, display device 100 includes a bezel (e.g., a rim, a retainer, etc.), shown as bezel 218. In some embodiments, bezel 218 extends substantially an entire perimeter of front portion 102.

Rear portion 104 is shown to include a first modular portion 214 and a second modular portion 216, according to some embodiments. In some embodiments, first modular portion 214 and second modular portion 216 are integrally formed. In some embodiments, first modular portion 214 and second modular portion 216 define rear portion 104. First modular portion 214 is shown to have an overall height substantially equal to height 202, according to some embodiments. In some embodiments, first modular portion 214 includes and/or is sides 108. In some embodiments, first modular portion 214 is configured to interface with one or more of sides 108 and front portion 102. For example, first modular portion 214 is configured to interface with sides 108 and/or front portion 102 with at least one of a slip fit, a frictional fit, a snap fit, fasteners, etc., according to some embodiments.

In some embodiments, second modular portion 216 has a height 210 and depth 208. Height 210 is shown less than overall height 202 of display device 100, according to some embodiments. In some embodiments, height 210 is substantially equal to or greater than overall height 202. In some embodiments, second modular portion 216 protrudes (e.g., extends, juts from, extrudes from, etc.), surface 306 of first modular portion 214. In some embodiments, second modular portion 216 protrudes a distance from surface 306 substantially equal to depth 208. Advantageously, if display device 100 is a wall-mounted display device, second modular portion 216 is configured to extend within and be received by an aperture of the wall, according to some embodiments. In some embodiments, second modular portion 216 extends at least partially within an aperture of a wall. In some embodiments, first modular portion 214 extends at least partially within an aperture of a wall. For example, in some embodiments, the aperture (e.g., of the wall) is a recess (e.g., cavity, indent) which is stepped to both receive first modular portion 214 and at least partially receive second modular portion 216. In some embodiments, second modular portion 216 extends from surface 306 of first modular portion 214 which is disposed sub-flush a rim 402 of first modular portion 214. In some embodiments, rim 402 is cooperatively formed by sides 108. In some embodiments, rim 402 extends along an entire perimeter of first modular portion 214. In some embodiments, rim 402, surface 306, and sides 312 of second modular portion define a recess 404 having a width 406 which runs along an entire perimeter of display device first modular portion 214. In some embodiments, recess 404 is configured to interface with a protrusion of a mounting plate (e.g., a wall mounting plate, a wall, etc.).

In some embodiments, first modular portion 214 includes one or more fastener elements (e.g., posts, apertures, threaded bores, clips, latches, etc. configured to fasten display device 100 to a wall), shown as fastener elements 308. Fastener elements 308 are shown as bores configured to receive a fastener to removably couple display device 100 to a surface. In some embodiments, fastener elements 308 are threaded bores. In some embodiments, fastener elements 308 are bores configured to receive self-tapping screws. In some embodiments, fastener elements 308 are disposed along a patterned path. In some embodiments, fastener elements 308 are disposed proximate corners of display device 100. In some embodiments, fastener elements 308 are evenly spaced a distance apart.

In some embodiments, second modular portion 216 is generally rectangular having sides (e.g., walls, panels, sidewalls, etc.), shown as sides 312. In some embodiments, second modular portion 216 is a generally rectangular shape having a length 304 and a height 210. In some embodiments, adjacent sides 312 form a rounded intersection point. For example, side 312c and side 312a are adjacent each other, and intersect to form a fillet. In some embodiments, second modular portion 216 is a generally rectangular shape having filleted (e.g., rounded) corners. In some embodiments, second modular portion 216 is a generally rectangular shape having chamfered corners. In some embodiments, first modular portion 214 is generally rectangular shaped having height 202 and length 302. In some embodiments, first modular portion 214 is generally rectangular shaped having filleted corners (e.g., corners 310). In some embodiments, first modular portion 214 is generally rectangular shaped having chamfered corners. In some embodiments, a center of a cross section of first modular portion 214 is substantially coincident with a center of a cross section of second modular portion 216.

In some embodiments, second modular portion 216 includes a surface (e.g., a back surface, a back plate, a back panel, a back wall, etc.), shown as rear surface 314. In some embodiments, rear surface 314 includes any of fastener elements 308. In some embodiments, rear surface 314 includes one or more apertures (e.g., bores, openings, through-holes, rectangular openings, etc.), configured to facilitate wired connections to a controller (e.g., a processing circuit, a power board, etc.) disposed within display device 100. In some embodiments, rear surface 314 is removably connected to sides 312, facilitating easy access to internal components of display device 100. In some embodiments, rear surface 314 is removably connected to sides 312 with any one of or a combination of fasteners, a slip fit, a frictional fit, a snap fit, etc. In some embodiments, rear surface 314 is configured to be received by an aperture cooperatively formed by sides 312.

In some embodiments, surface 306 of first modular portion 214 includes a rectangular aperture (e.g., opening, recess, hole, etc.), shown as rectangular opening 316. In some embodiments, rectangular opening 316 is configured to receive a protrusion of another member (e.g., a mounting plate, a wall, etc.) to connect display device 100 to the other member. In some embodiments, rectangular opening 316 is configured to allow a wired connection (e.g., a USB connection, a power connection, etc.) to a controller disposed within display device 100. In some embodiments, one or more rectangular openings 316 are included on rear surface 314.

Figure 5:
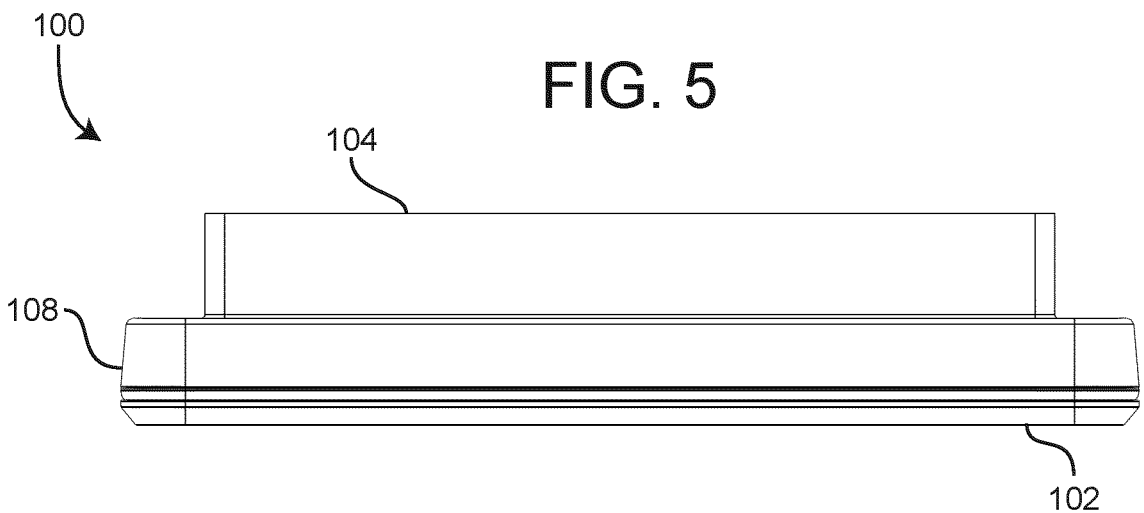
FIG. 5 is a top view of the display device of FIG. 1, according to some embodiments.
Figure 6:
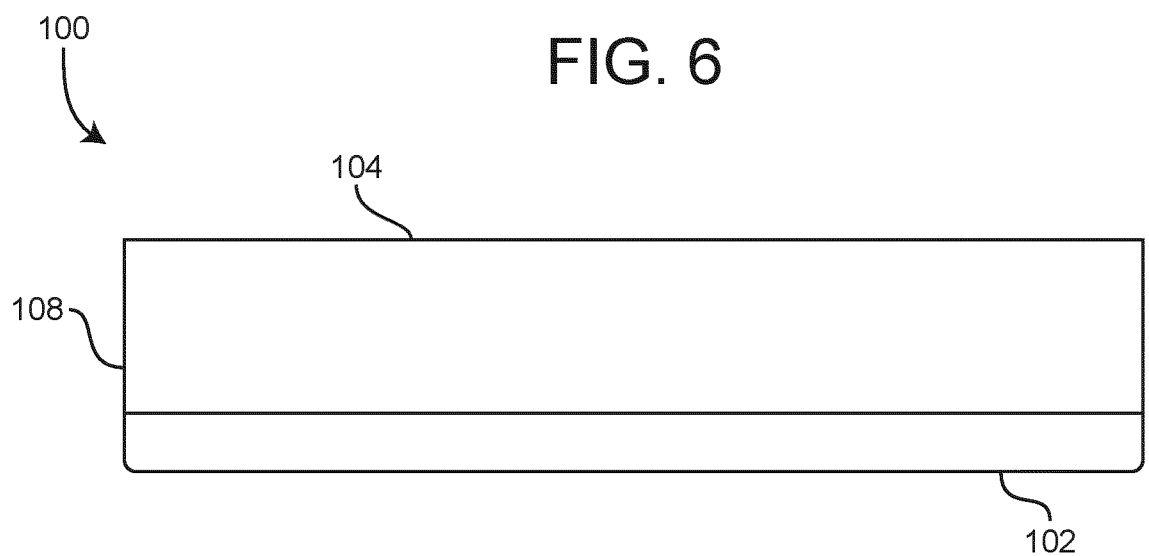
FIG. 6 is a top view of the display device of FIG. 1, according to some embodiments.
Figure 7:
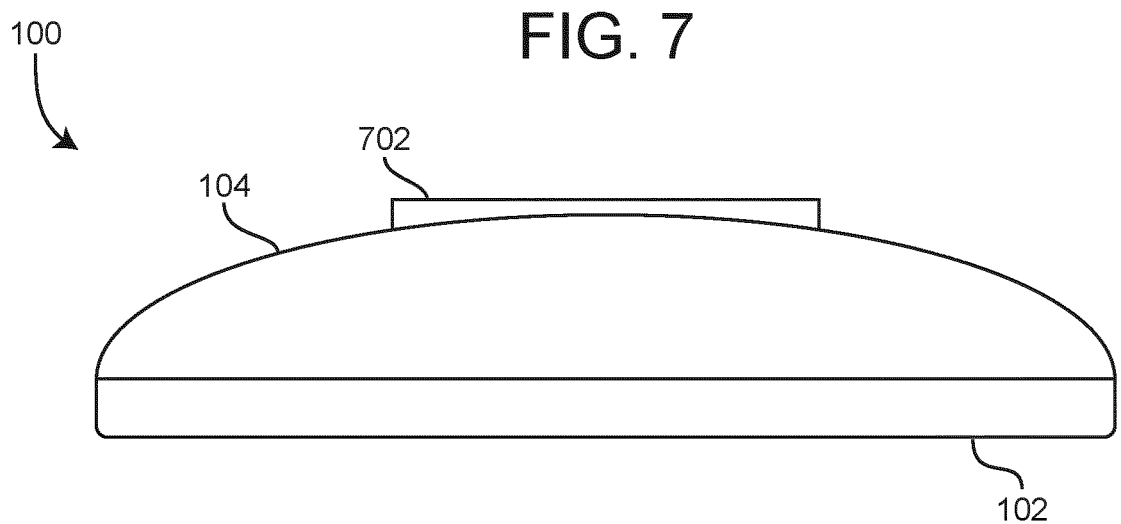
FIG. 7 is a top view of the display device of FIG. 1, according to some embodiments.

Referring now to FIGS. 5-7, various configurations display device 100 are shown, according to some embodiments. Referring now to FIG. 5 display device 100 is shown according to FIGS. 1-4, according to some embodiments. In some embodiments, display device 100 includes front portion 102 and rear portion 104 which couple with each other. Front portion 102 is shown having an overall rectangular shape with length (e.g., length 302) greater than length (e.g., length 304) of rear portion 104, according to some embodiments.

Referring now to FIG. 6, display device 100 is shown having rear portion 104 substantially equal in length to length of front portion 102, according to some embodiments. In some embodiments, rear portion 104 is generally rectangular shaped.

Referring now to FIG. 7, display device 100 is shown including a rear portion 104 which is generally curved, according to some embodiments. In some embodiments, rear portion 104 includes a mounting plate 702 configured to facilitate mounting of display device 100 to a surface (e.g., a wall). In some embodiments, mounting plate 702 is integrally formed with rear portion 104. In some embodiments, mounting plate 702 includes a flat rear surface configured to interface with the flat surface. In some embodiments, mounting plate 702 includes one or more fastener elements (e.g., screws, clips, hangers, etc.), configured to removably couple mounting plate 702 with the surface.

Figure 8:
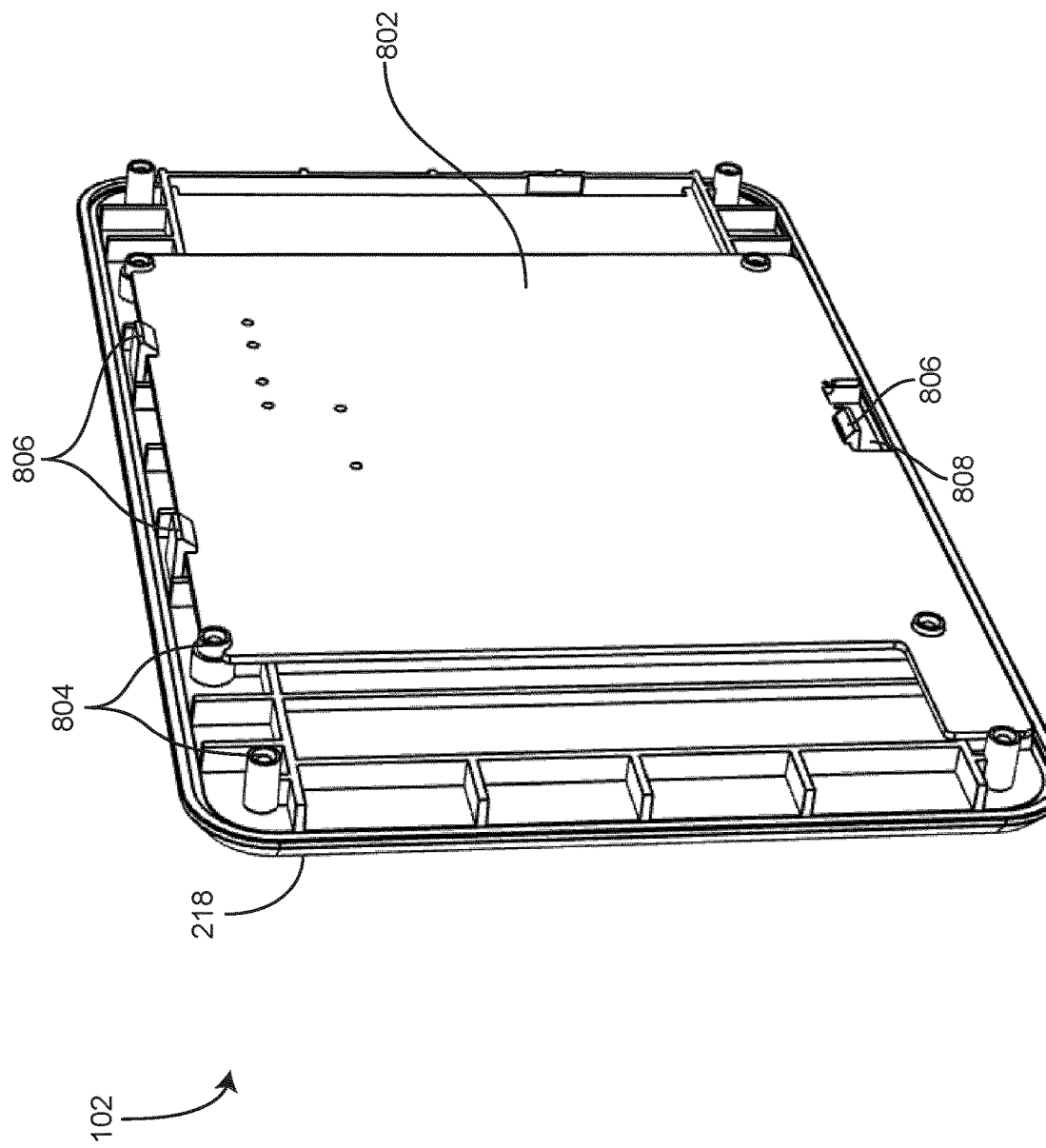
FIG. 8 is a rear elevated view of a front portion of the display device of FIG. 1, according to some embodiments.
Figure 9:
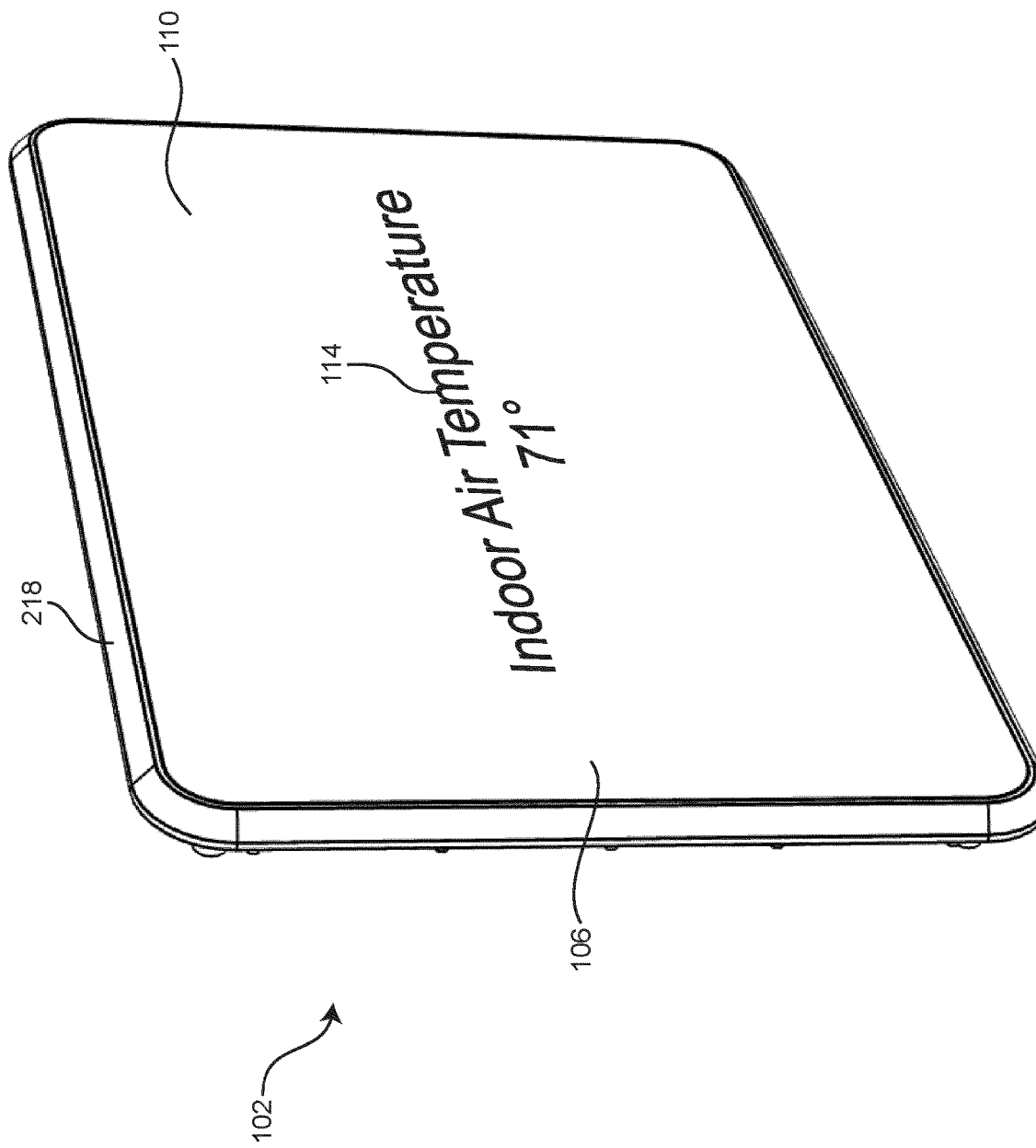
FIG. 9 is a front elevated view of the front portion of FIG. 8, according to some embodiments.

Referring now to FIGS. 8 and 9, front portion 102 is shown in greater detail, according to some embodiments. In some embodiments, front portion 102 is configured to couple (e.g., removably, etc.) with a controller (e.g., a processing circuit) 802. In some embodiments, controller 802 is configured to control an operation of user interface 106. In some embodiments, controller 802 is configured to removably couple with front portion 102 with one or more retaining clips 806 (e.g., snap clips, latches, etc.). In some embodiments, retaining clips 806 protrude from front portion 102 and are configured to interface with an edge of controller 802. In some embodiments, controller 802 includes one or more notches 808 (e.g., recessions, grooves, etc.) configured to facilitate coupling between controller 802 and front portion 102. In some embodiments, notches 808 provide an edge with which retaining clips 806 interface.

Referring still to FIGS. 8 and 9, front portion 102 is shown to include posts 804, according to some embodiments. In some embodiments, posts 804 extend from front portion 102. In some embodiments, posts 804 provide a surface to which controller 802 is adjacent. In some embodiments posts 804 include a bore configured to interface with a fastener. For example, the bore is a threaded bore, according to some embodiments. In some embodiments, one or more of posts 804 extend to a surface or a corresponding post of rear portion 104. In some embodiments, posts 804 extend from a back surface of front portion 102. In some embodiments, bezel 218 retains at least one of user interface 106 or covering 110 in position.

Figure 10:
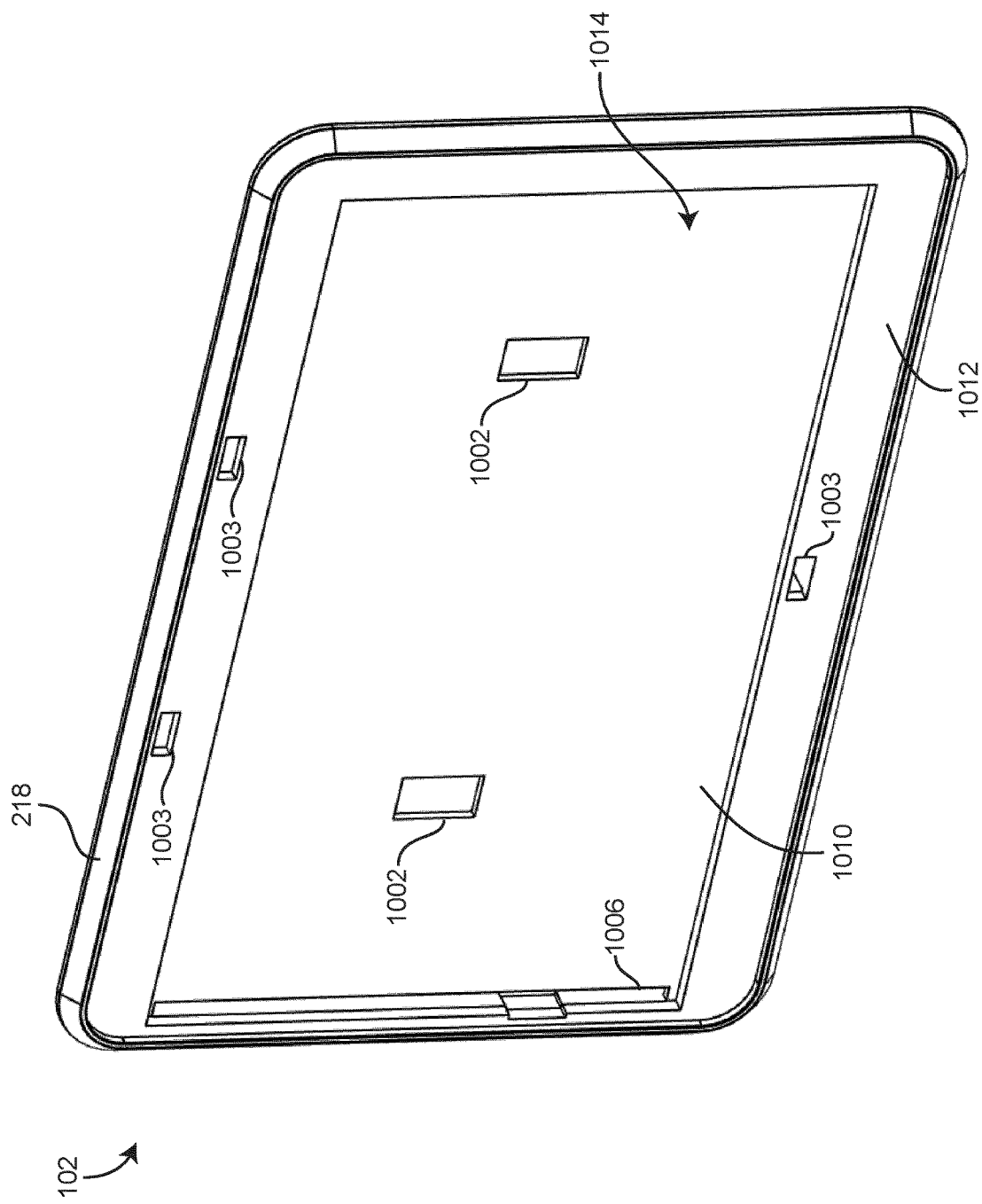
FIG. 10 is a front isometric view of the front portion of FIG. 8, according to some embodiments.

Referring now to FIG. 10, front portion 102 is shown without user interface 106 and covering 110 assembled, according to some embodiments. In some embodiments, front portion 102 includes a first surface 1012 and a second surface 1010. In some embodiments, second surface 1010 is offset a distance relative to surface 1012 such that second surface 1010 offset the distance relative to surface 1012 defines a recess (e.g., an indent, an aperture, etc.), shown as recess 1014. In some embodiments, recess 1014 is configured to receive user interface 106. In some embodiments, second surface 1010 includes one or more apertures (e.g., openings, holes, etc.), shown as rectangular apertures 1002. In some embodiments, rectangular apertures 1002 facilitate wired connection between user interface 106 and a controller. In some embodiments, rectangular apertures 1002 facilitate removable connection between user interface 106 and front portion 102.

In some embodiments, recess 1014 is generally rectangular. Recess 1014 is shown to include an aperture (e.g., opening, hole, etc.), shown as vertical aperture 1006, according to some embodiments. In some embodiments, vertical aperture 1006 is a notch and extends partially along a height of second surface 1010. In some embodiments, front portion 102 includes one or more apertures, shown as apertures 1003. In some embodiments, apertures 1003 are rectangular and extend at least partially into first surface 1012.

Figure 11:
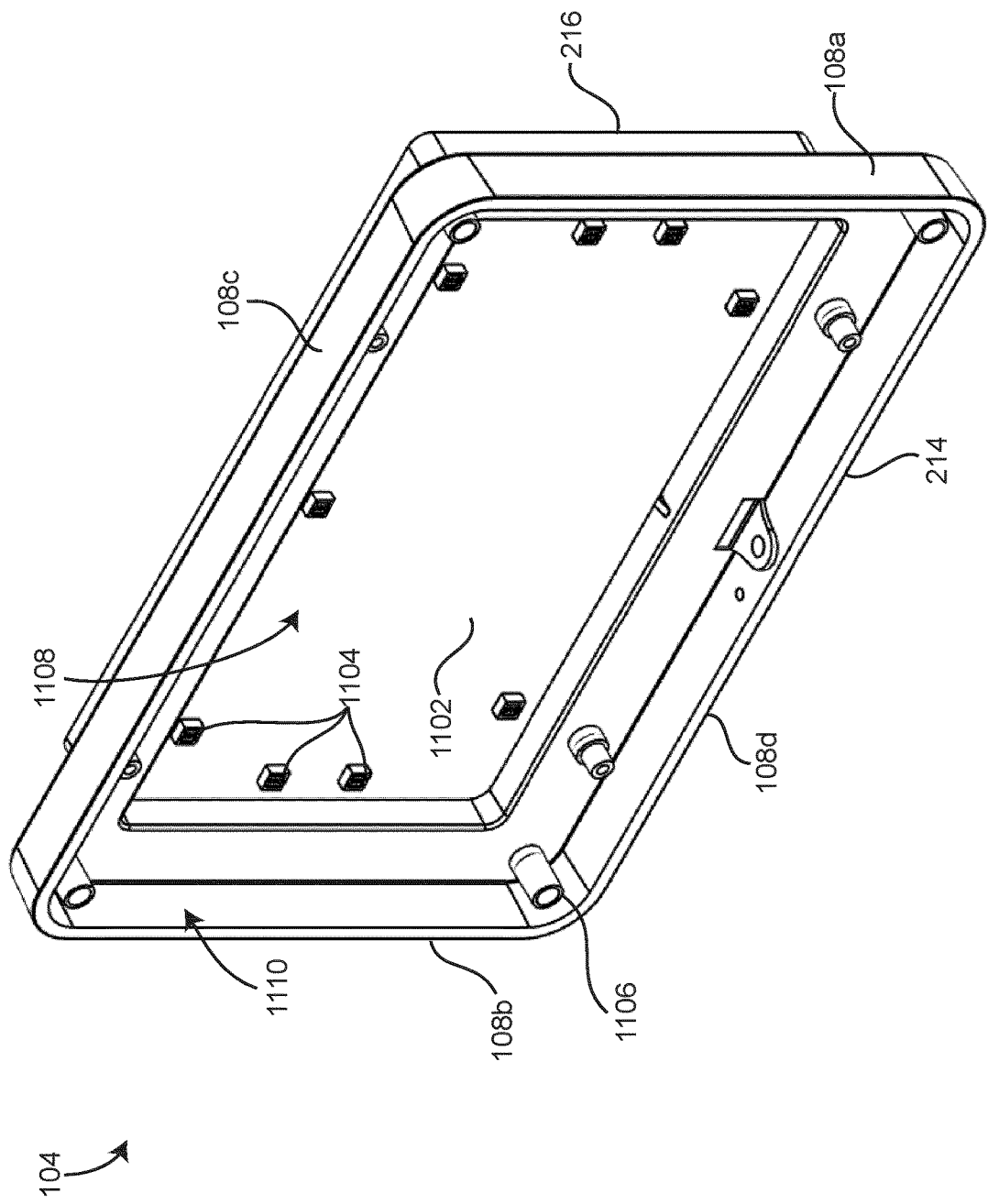
FIG. 11 is an isometric view of a rear portion of the display device of FIG. 1, shown to include an LED board, according to some embodiments.

Referring now to FIG. 11, rear portion 104 is shown in greater detail, according to some embodiments. Rear portion 104 includes an LED board 1102 (e.g., a processing circuit, a controller, a PCB board, etc.) disposed within an inner volume 1108 of second modular portion 216, according to some embodiments. In some embodiments, LED board 1102 is disposed within an inner volume 1110 of first modular portion 214. LED board 1102 is shown to include light emitting devices, shown as LEDs 1104, according to some embodiments. In some embodiments, LEDs 1104 are configured to emit light which is directed through halo 112 and emits from a side of display device 100. In some embodiments, LED board 1102 is communicably connected with controller 802.

Referring still to FIG. 11, rear portion 104 is shown to include mating posts 1106, according to some embodiments. In some embodiments, mating posts 1106 are configured to interface (e.g., be adjacent to) a surface of front portion 102. In some embodiments, mating posts 1106 facilitate removable connection between front portion 102 and rear portion 104.

LED Board

Figure 12:
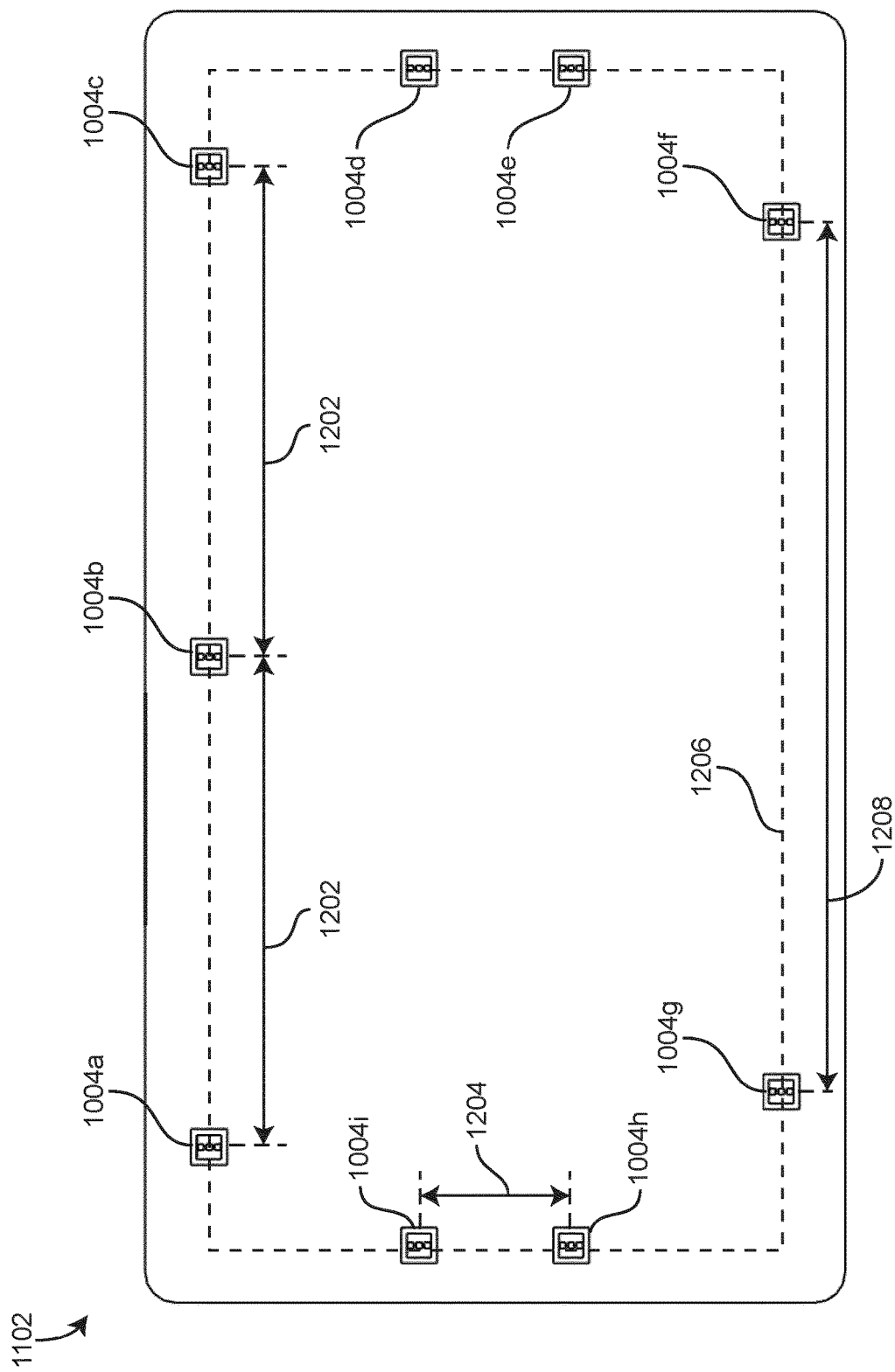
FIG. 12 is a front view of the LED board of FIG. 11, according to some embodiments.
Figure 13:
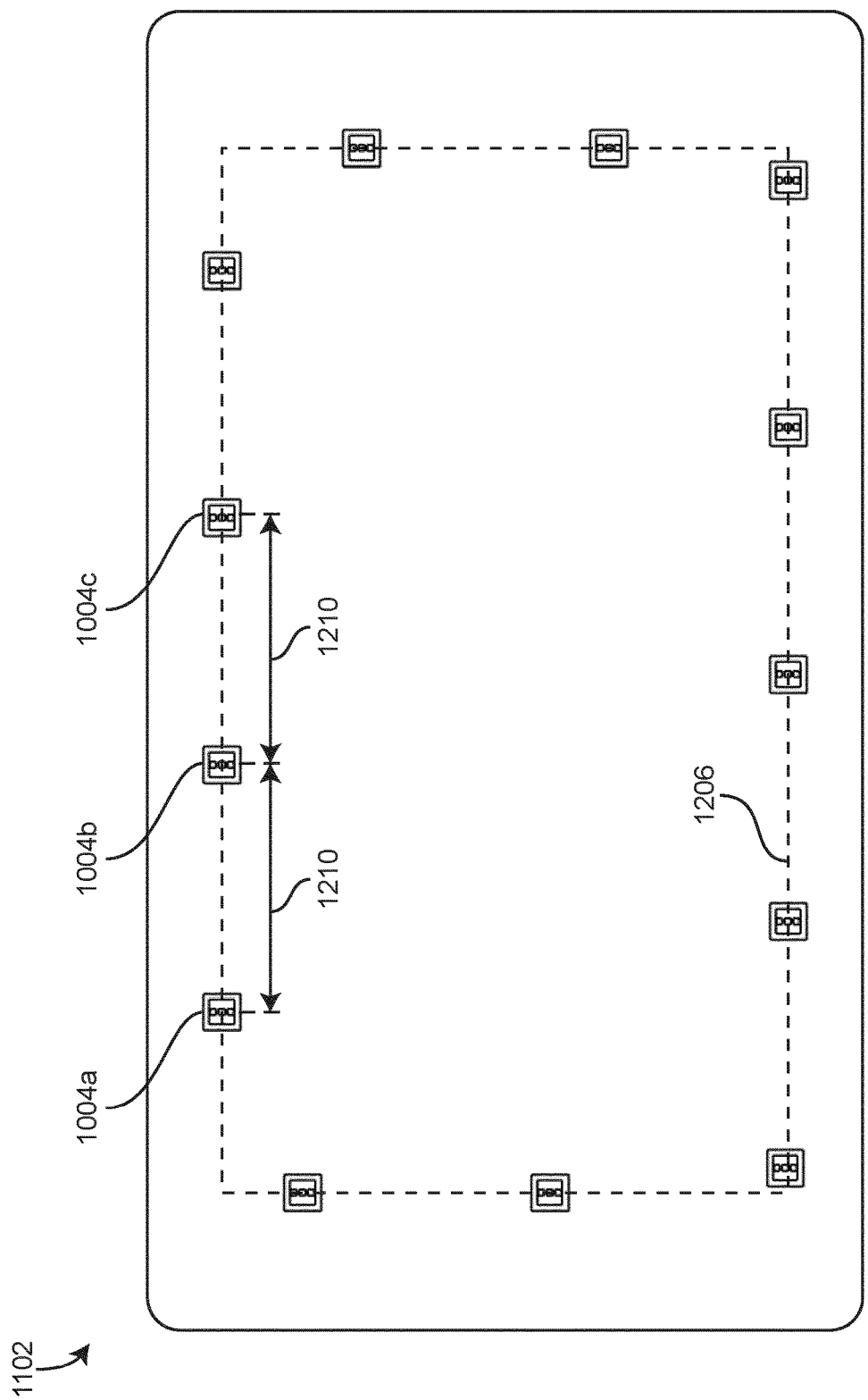
FIG. 13 is a front view of the LED board of FIG. 11, according to some embodiments.

Referring now to FIGS. 12 and 13, LED board 1102 is shown in greater detail, according to some embodiments. FIG. 12 shows LEDs 1004 disposed along path 1206, according to some embodiments. Path 1206 is generally rectangular, according to some embodiments. In some embodiments, path 1206 is generally elliptical, generally square, etc., or any other geometric shape. In some embodiments, LEDs 1004 are spaced non-evenly along path 1206. For example, as shown in FIG. 12, LED 1004a is disposed a distance 1202 from adjacent LED 1004b along path 1206, while LED 1004g is disposed a distance 1208 from adjacent LED 1004f along path 1206, according to some embodiments. In some embodiments, LEDs 1004 are placed along path 1206 based on a desired function of display device 100. In some embodiments, LEDs 1004 are light emitting diodes. In some embodiments, LEDs 1004 are multi-color LEDs (e.g., red-green-blue (RGB) LEDs). In some embodiments, LEDs 1004 are single color LEDs (e.g., white LEDs). In some embodiments, LEDs 1004 are dimmable LEDs (e.g., brightness can be adjusted, intensity of emitted light can be adjusted, etc.). In some embodiments, LEDs 1004 receive signals through LED board 1102 to cause LEDs 1004 to adjust a brightness of one or more of LEDs 1004. In some embodiments, LEDs 1004 receive signals through LED board 1102 to cause LEDs 1004 to switch from an on-state to an off-state. In some embodiments, LEDs 1004 receive signals through LED board 1102 to adjust a color of one or more of LEDs 1004. Any of the brightness, on/off state, color, etc., of any of LEDs 1004 is adjusted according to one or more predetermined patterns, according to some embodiments. For example, in some embodiments, certain LEDs 1004 (e.g., LEDs 1004a-c) are actuated between an on-state and an off-state for a predetermined amount of time (e.g., on for 5 seconds, off for 4 seconds, etc.) while other LEDs 1004 (e.g., LEDs 1004d-i) are not actuated between an on-state and an off-state. Any of the dimming, color, etc., of o any of LEDs 1004 is configured to operate according to a similar pattern, or a combination of patterns thereof.

As shown in FIG. 12, LED board 1102 includes nine LEDs 1004, according to some embodiments. In some embodiments, LED board 1102 includes more or less than nine LEDs 1004.

FIG. 13 shows LEDs 1004 equally spaced along path 1206, according to some embodiments. For example, LED 1004a is shown spaced a distance 1210 along path 1206 from LED 1004b, according to some embodiments. In some embodiments, each of LEDs 1004 are spaced distance 1210 along path 1206 relative to a neighboring LED 1004. For example, LEDs 1004a-b are spaced distance 1210 apart along path 1206, and LEDs 1004b-c are also spaced distance 1210 apart along path 1206, according to some embodiments. In some embodiments, one or more of LEDs 1004 are offset relative to path 1206. For example, LED 1004a is offset a predetermined amount from path 1026, according to some embodiments. In some embodiments, each of LEDs 1004 are proximate a portion of halo 112.

Halo

Referring now to FIGS. 14-19, halo 112 is shown in greater detail, according to some embodiments. In some embodiments, halo 112 is configured to receive light emitted by any of LEDs 1004 and direct, diffuse, scatter, etc., the emitted light along at least one of sides 108. In some embodiments, halo 112 is configured to produce a glow along at least one of sides 108. Since LEDs 1004 can be configured to operate in a patterned manner (e.g., on-state, off-state, brightness, color, etc.), halo 112 may diffuse, direct, scatter, etc., the emitted light along at least one of sides 108 according to a currently used pattern, according to some embodiments. In some embodiments, halo 112 facilitates a glow along sides 108 of display device 100. In some embodiments, halo 112 facilitates indicating a message to a user (e.g., a particular pattern represents and/or corresponds to a particular event). In some embodiments, halo 112 facilitates a wider off-axis viewing angle of the message. For example, in some embodiments, display device 100 is a thermostat. In some embodiments, LEDs 1004 may transition between a blue color and a red color which corresponds to the indoor air temperature of the conditioned space. In some embodiments, the blue color indicates a low temperature, and the red color indicates a high temperature. In some embodiments, a wavelength (λ) of light emitted by LEDs 1004 and directed by halo 112 is dependent on the temperature. In some embodiments, LEDs 1004 emit light at any wavelength (λ) within the visible spectrum of light. Advantageously, this facilitates notifying a user or an occupant of the conditioned space without the user/occupant necessarily being able to observe user interface 106, according to some embodiments. For example, if a user is not in front of display device 100 such that the user can observe user interface 106 directly, the user may still be notified of a changing temperature (or any other variable) of the conditioned space by observing the light emitted from display device 100 by halo 112.

In some embodiments, halo 112 is or includes translucent and/or transparent material. In some embodiments, halo 112 is configured to allow light to pass through. In some embodiments, one or more exterior surfaces of halo 112 are coated with a material which does not allow light to pass through. For example, in some embodiments, all exterior surfaces of halo 112 are coated with a material (e.g., a coating, a paint, etc.)

Figure 14:
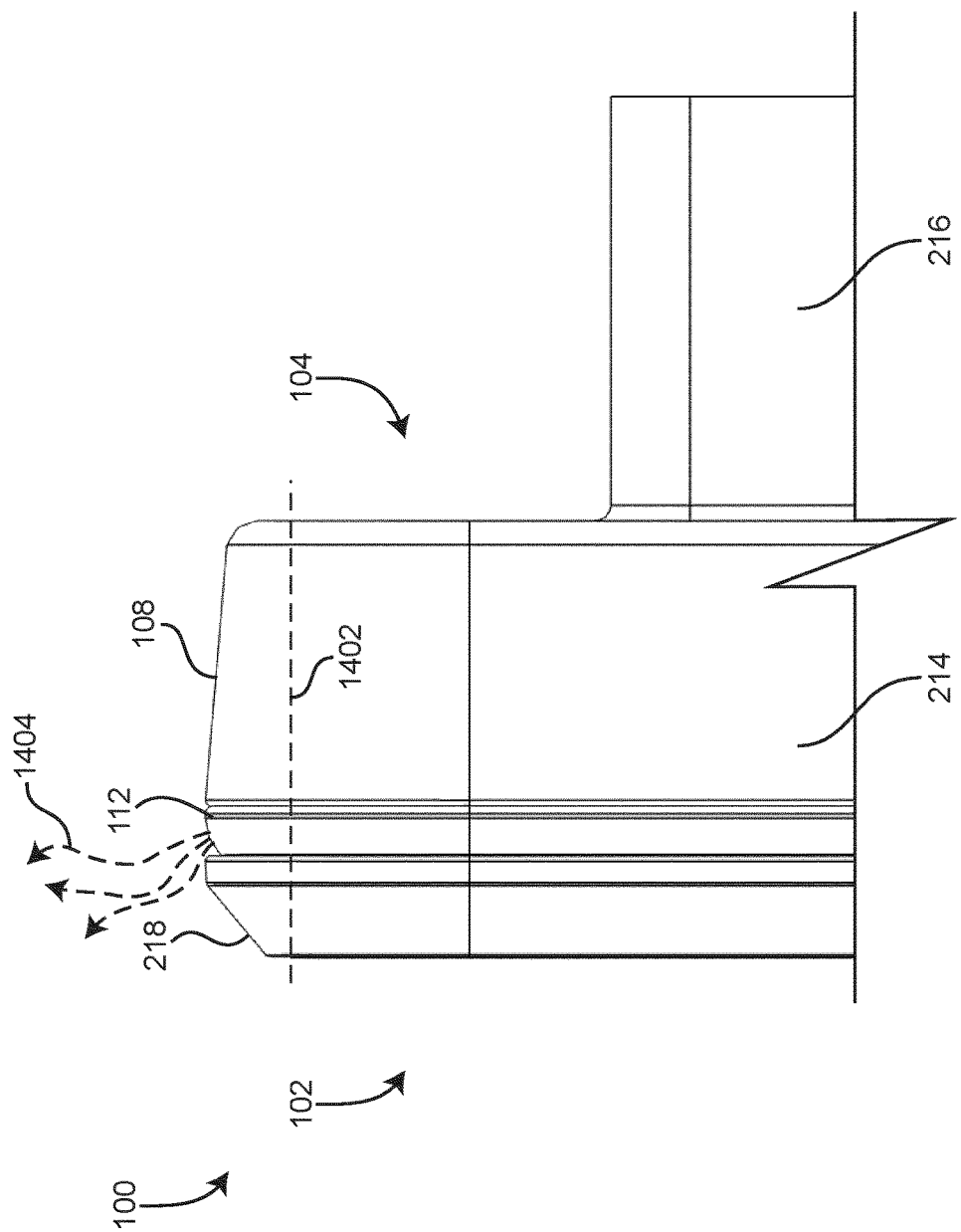
FIG. 14 is a side view of a portion of the display device of FIG. 1, shown to include a halo, according to some embodiments.

Referring to FIG. 14, in some embodiments, at least a portion of halo 112 is positioned between front portion 102 and rear portion 104. In some embodiments, at least a portion of halo 112 is positioned adjacent front portion 102 at a first side and adjacent rear portion 104 at an opposite site. In some embodiments, at least a portion of halo 112 is adjacent bezel 218.

Referring still to FIG. 14, an outer edge of halo 112 is shown angled relative to a horizontal axis 1402, according to some embodiments. In some embodiments, the outer edge of halo 112 is arcuate, curved, etc. In some embodiments, halo 112 extends along an entire perimeter of display device 100. In some embodiments, the angled/curved profile of halo 112 facilitates a directing of light. For example, in FIG. 14, an outer edge of halo 112 is angled such that emitted light 1404 is generally directed towards a front of display device 100.

Figure 15:
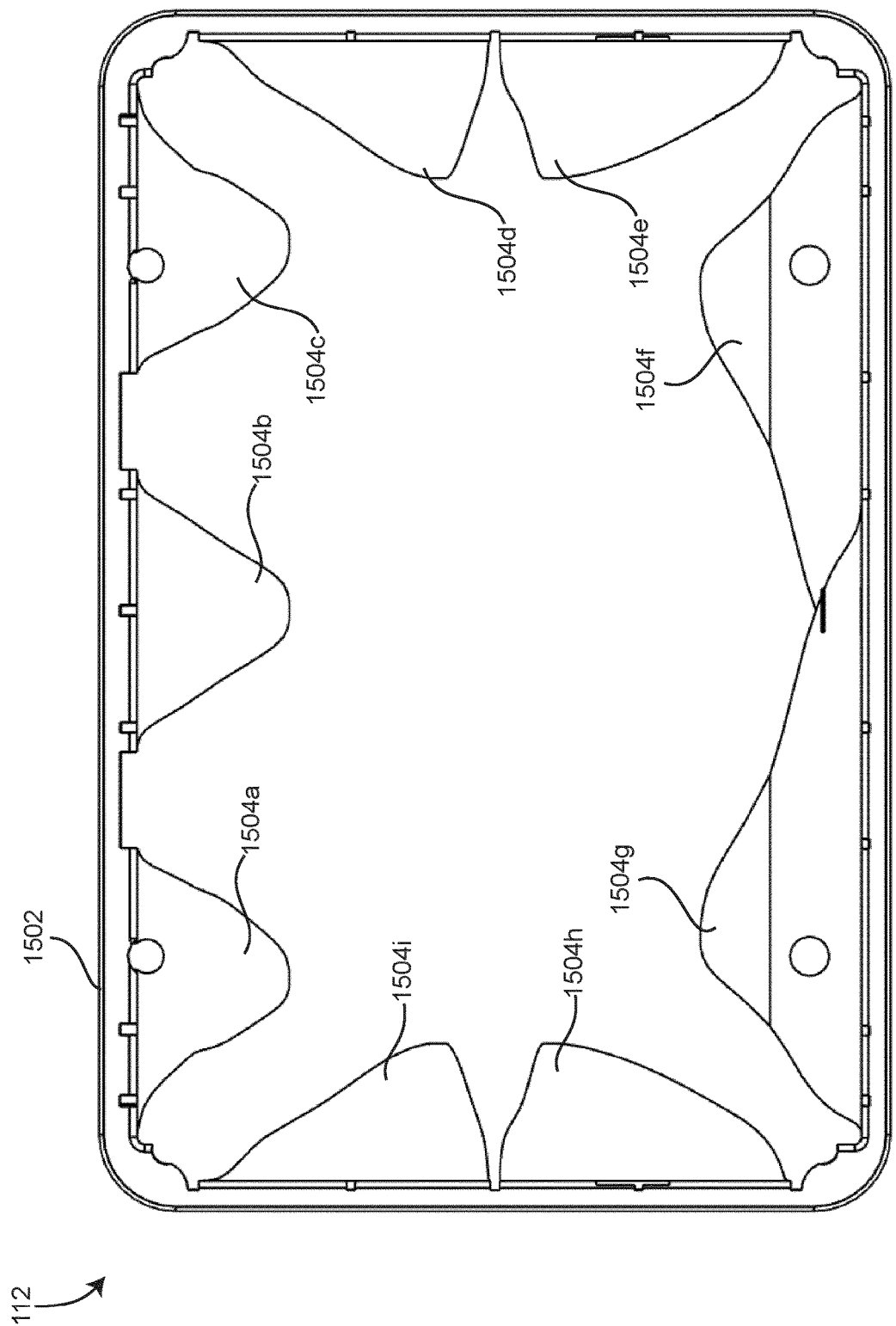
FIG. 15 is a front view of the halo of FIG. 14, according to some embodiments.
Figure 16:
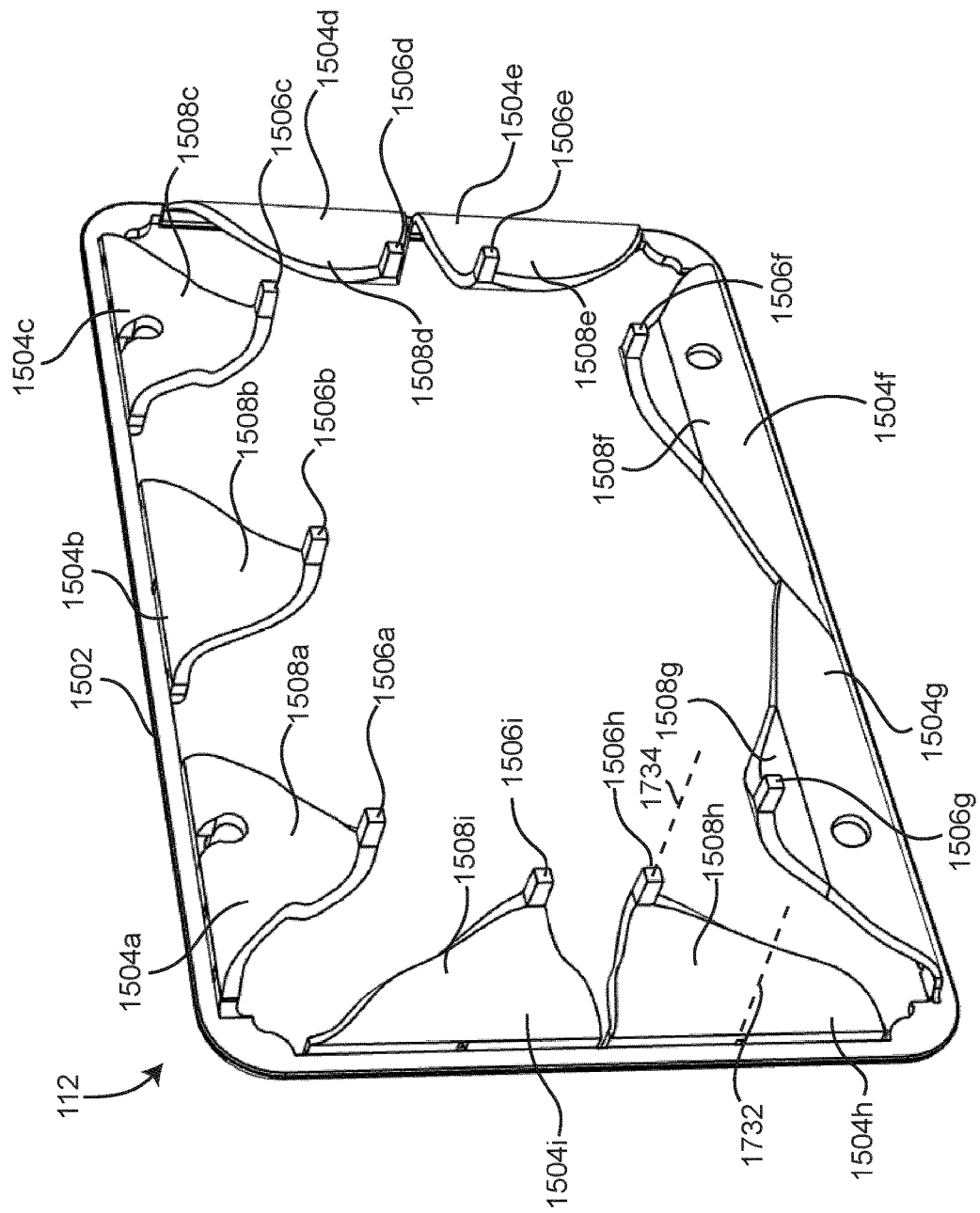
FIG. 16 is a rear elevated view of the halo of FIG. 14, shown to include light guiding elements, according to some embodiments.

Referring now to FIGS. 15 and 16, halo 112 is shown in greater detail, according to some embodiments. FIG. 15 shows a front view of halo 112, according to some embodiments. FIG. 16 shows a perspective view of halo 112, according to some embodiments. Halo 112 is shown to include light directing elements, shown as wave guides 1504, according to some embodiments. In some embodiments, wave guides 1504 are configured to at least one of direct, diffuse, guide, etc., light emitted by one or more of LEDs 1104. In some embodiments, wave guides 1504 are configured to at least one of direct, diffuse, guide, etc., light emitted by a corresponding LED 1104. For example, wave guide 1504 is configured to at least one of direct, guide, diffuse, etc., light emitted by LED 1104a, according to some embodiments. In some embodiments, each of wave guides 1504 include a corresponding LED 1104.

In some embodiments, wave guides 1504 are a substantially translucent and/or transparent material. In some embodiments, wave guides 1504 are cladded with an opaque material. In some embodiments, exterior surfaces of wave guide 1504 which do not either facilitate an entry or an egress of light into/out of wave guides 1504 is cladded with the opaque material. In some embodiments, the opaque material is painted onto exterior surfaces of wave guides 1504.

In some embodiments, wave guides 1504 include a sweep portion 1508 and a receiving post 1506. In some embodiments, sweep portions 1508 of wave guides 1504 protrude from a rim 1502 (e.g., bezel, surrounding edge, etc.) of halo 112. In some embodiments, wave guides 1504 protrude from rim 1502 along a curved path. In some embodiments, a width of sweep portion 1508 of wave guides 1504 varies (e.g., decreases) along the curved path. In some embodiments, wave guides 1504 include a receiving post (e.g., a square receiving post, a rectangular receiving post, a square receiving post, etc.) which protrudes from an end point of sweep portion 1508. In some embodiments, any or all of rim 1502, sweep portions 1508 and receiving posts 1506 are integrally formed.

In some embodiments, receiving posts 1506 are configured to facilitate entry of light into wave guides 1504. In some embodiments, receiving posts 1506 include a surface which is not covered with an opaque material (e.g., not cladded) configured to facilitate entry of light emitted by one or more of LEDs 1104 into wave guide 1504. In some embodiments, receiving posts 1506 protrude such that an end of receiving posts 1506 is substantially adjacent to the corresponding LED 1104. In some embodiments, the end of receiving posts 1506 contacts an exterior surface of a corresponding LED 1104.

Figure 17:
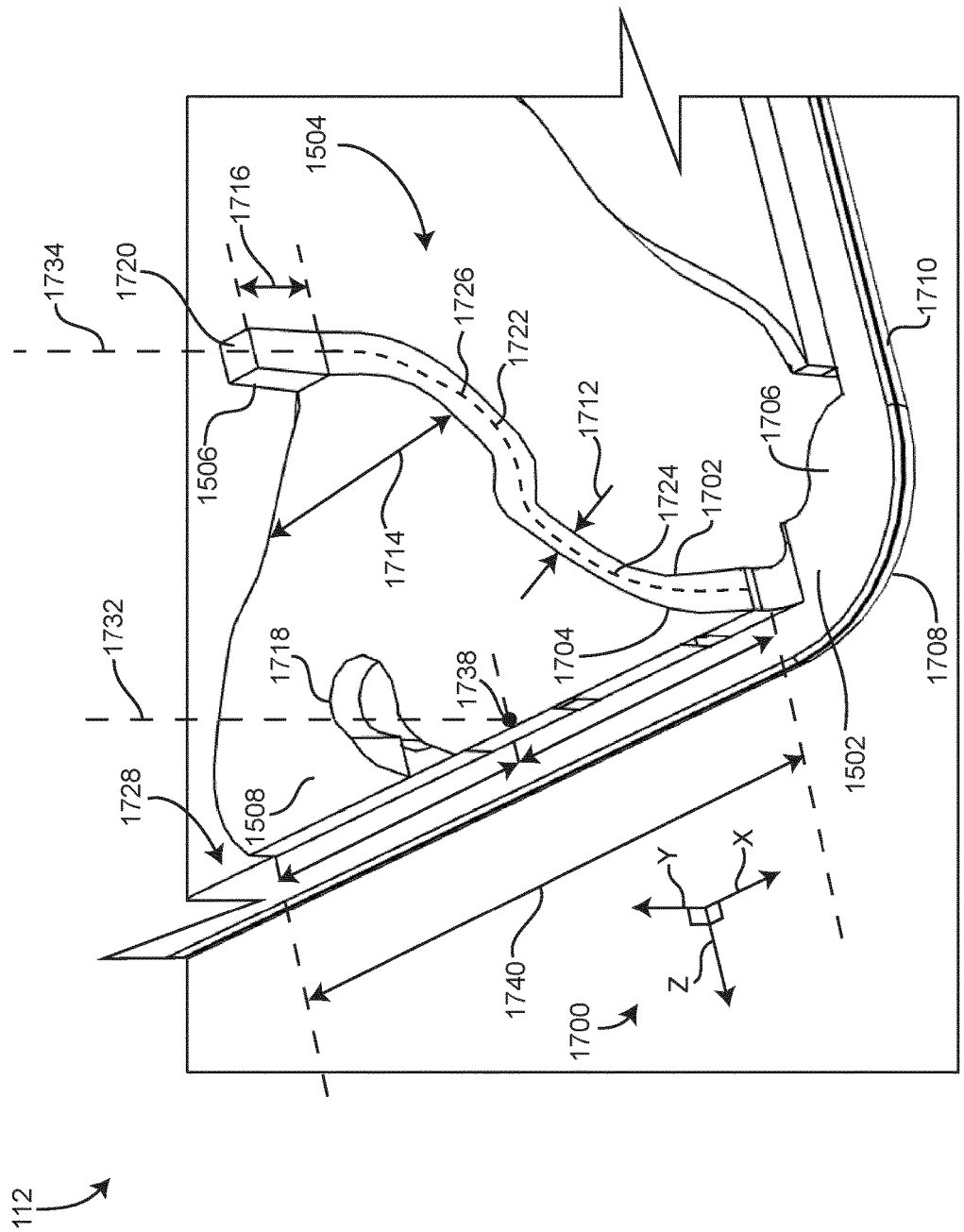
FIG. 17 is an elevated view of one of the light guiding elements of FIG. 16, according to some embodiments.
Figure 18:
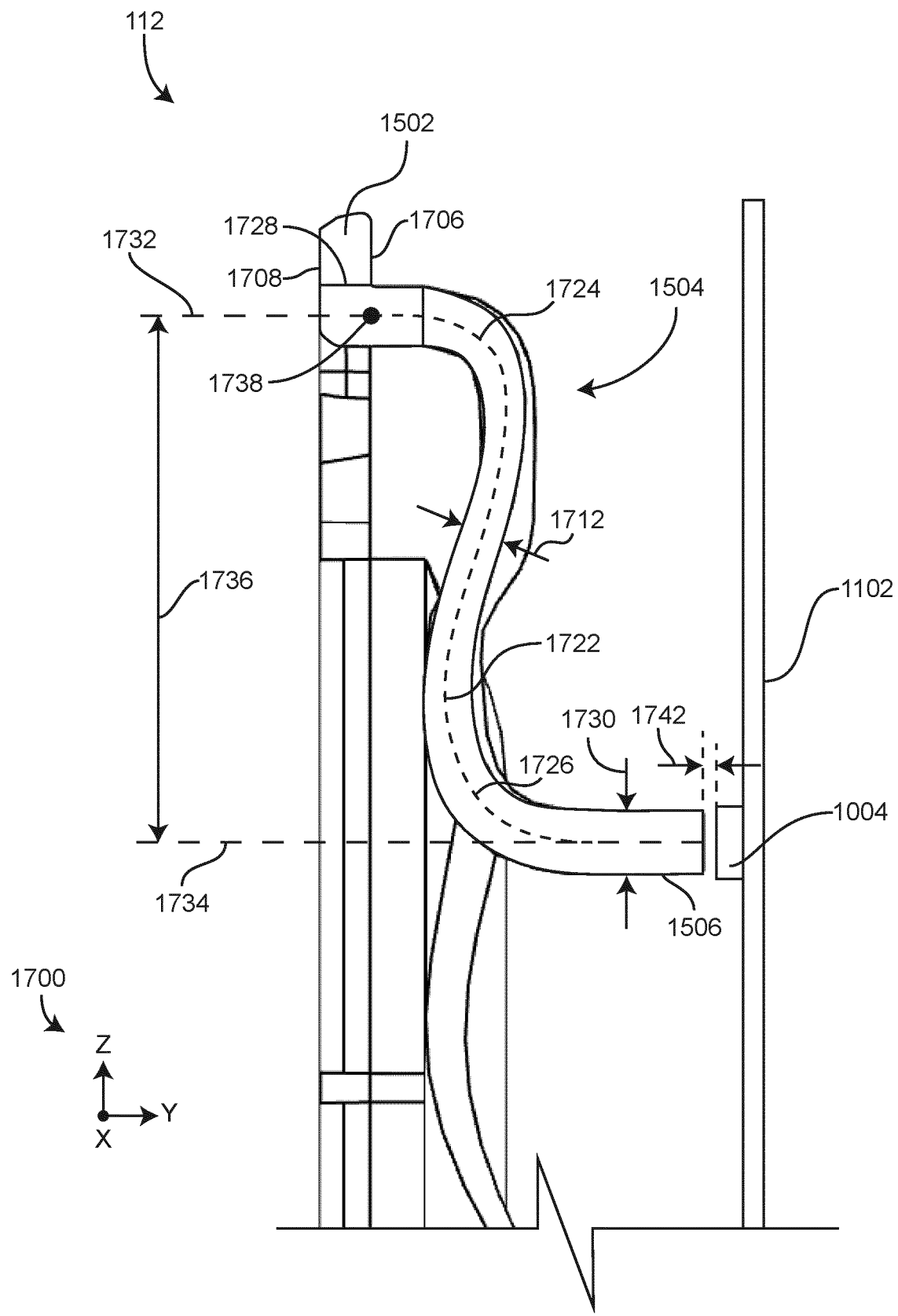
FIG. 18 is a side view of one of the light guiding elements of FIG. 16, shown receiving light from an LED, according to some embodiments.

Referring now to FIGS. 17 and 18, one of wave guides 1504 is shown in greater detail, according to some embodiments. In some embodiments, wave guides 1504 are generally S-shaped. Wave guide 1504 includes sweep portion 1508 and receiving post 1506, according to some embodiments. In some embodiments, sweep portion 1508 protrudes from rim 1502 of halo 112. Sweep portion 1508 is shown following path 1722 and having thickness 1712, according to some embodiments. In some embodiments, path 1722 is a centerline of sweep portion 1508. In some embodiments, path 1722 is a curved path, having a non-constant radius. In some embodiments, path 1722 is generally S-shaped. In some embodiments, path 1722 includes a convex portion 1724 and a concave portion 1726. In some embodiments, sweep portion 1508 protrudes from a first surface 1706 of rim 1502. In some embodiments, sweep portion 1508 protrudes from a second surface 1708 of rim 1502. In some embodiments, first surface 1702 and second surface 1708 of rim 1502 are opposite each other and define a thickness of rim 1502. In some embodiments, sweep portion 1508 protrudes from an interior surface 1728 of rim 1502. FIGS. 17 and 18 are shown to include a coordinate system 1700, according to some embodiments. In some embodiments, coordinate system includes an x-axis, a y-axis, and a z-axis. Any of wave guides 1504 includes a corresponding coordinate system 1700, according to some embodiments. In some embodiments, wave guides 1504 are generally S-shaped and have non-constant width. In some embodiments, wave guides 1504 are generally S-shaped from a side view. In some embodiments, wave guides 1504 are generally S-shaped and have a first end and a second end. In some embodiments, the second end is configured to receive light emitted by light emitting devices (e.g., LEDs 1004, LEDs 2026, etc.).

In some embodiments, rim 1502 is coated with the opaque material. In some embodiments, first surface 1706, second surface 1708 and interior surface 1728 are coated with the opaque material. In some embodiments, if sweep portion 1508 protrudes from interior surface 1728, at least part of an area of interior surface 1728 which sweep portion 1508 protrudes from is configured to allow light to pass through. In some embodiments, exterior surface 1710 is configured to facilitate egress of light from wave guide 1504. In some embodiments, exterior surface 1710 is configured to diffuse light which passes through wave guide 1504 along at least part of exterior surface 1710.

In some embodiments, sweep portion 1508 includes one or more exterior surfaces which are coated (e.g., cladded) with an opaque material configured to restrict the exit of light from wave guide 1504. In some embodiments, sweep portion 1508 includes first surface 1702 and second surface 1704. In some embodiments, first surface 1702 and second surface 1704 are opposite each other and are each offset an equal distance from path 1722 in opposite directions. In some embodiments, first surface 1702 and second surface 1704 substantially follow path 1722 at an offset distance. In some embodiments, first surface 1702 and second surface 1704 are coated (e.g., cladded) with the opaque material.

In some embodiments, an axis 1732 extends tangent to a starting point 1738 of path 1722. In some embodiments, an axis 1734 extends tangent to an end point of path 1722. In some embodiments, axis 1734 is a central axis of receiving post 1506. In some embodiments, axis 1734 extends tangent to the end point of path 1722 and is the central axis of receiving post 1506. In some embodiments, axis 1732 and axis 1734 are substantially parallel to each other. In some embodiments, axis 1732 and axis 1734 are substantially parallel to each other and are offset a distance 1736 from each other. In some embodiments, distance 1736 is a distance which is perpendicular to both axis 1732 and axis 1734. In some embodiments, distance 1726 is parallel to the Z-axis of coordinate system 1700. In some embodiments, axis 1732 extends tangentially outwards from starting point 1738 of path 1722 and starting point 1738 of path 1722 is disposed at a center point of initial width 1740 of sweep portion 1508. In some embodiments, axis 1732 and axis 1734 are offset relative to each other along the X-axis of coordinate system 1700 (e.g., laterally). For example, as shown in FIG. 16, In some embodiments, sweep portion 1508 has a width 1714. Width 1714 varies (e.g., decreases) along path 1722, according to some embodiments. In some embodiments, width 1714 decreases along path 1722 until it is substantially equal to thickness 1730 of receiving post 1506. In some embodiments, width 1714 decreases non-linearly. In some embodiments, sweep portion 1508 has initial width 1740 proximate the interface (e.g., connection) between rim 1502 and sweep portion 1508. In some embodiments, width 1714 decreases linearly. In some embodiments, width 1714 decreases (e.g., either linearly or non-linearly) along part of path 1722 and increases (e.g., either linearly or non-linearly) along another part of path 1722.

In some embodiments, receiving post 1506 protrudes from an end of sweep portion 1508. In some embodiments, receiving post 1506 protrudes tangentially outwards from an endpoint of path 1722. In some embodiments, receiving post 1506 extends in a direction substantially parallel to the Y-axis. In some embodiments, receiving post 1506 includes a receiving surface 1720, configured to facilitate entry of light emitted by one of LEDs 1004. In some embodiments, all other surfaces of receiving post 1506 are coated (e.g., cladded) with the opaque material to prevent light from exiting through the other surfaces.

In some embodiments, sweep portion 1508 has a constant thickness 1712 along an entire length of path 1722. In some embodiments, sweep portion 1508 has a variable thickness 1712 with respect to path 1722. For example, in some embodiments thickness 1712 increases, decreases, or a combination of both, along path 1722. In some embodiments, thickness 1712 is substantially equal to thickness 1730 of receiving post 1506. In some embodiments, thickness 1712 changes (e.g., increases, decreases, or a combination of both) along path 1722 and is substantially equal to thickness 1730 of receiving post 1506 at an end of path 1722 which receiving post 1506 protrudes from.

In some embodiments, receiving post 1506 has a height 1716. In some embodiments, receiving post 1506 protrudes from the end of sweep portion 1508 such that surface 1720 of receiving post is adjacent LED 1004. In some embodiments, receiving post 1506 protrudes from the end of sweep portion 1508 such that surface 1720 is distance 1742 from LED 1004. In some embodiments, distance 1742 is negligible.

Figure 19:
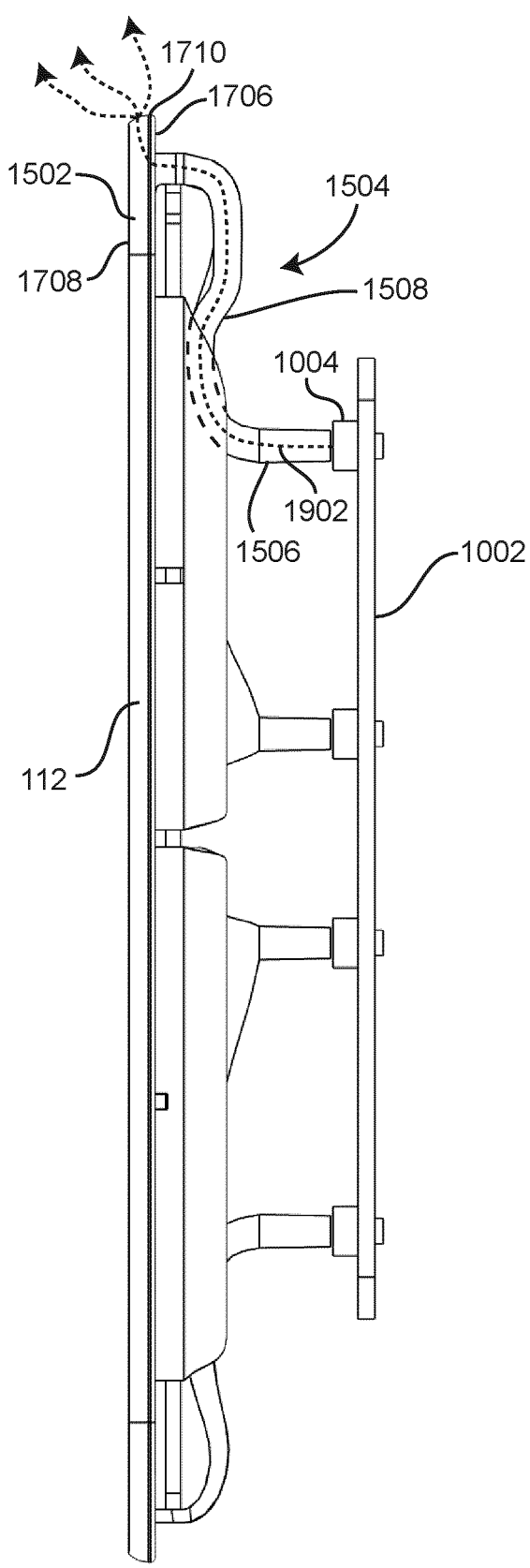
FIG. 19 is a side view of the halo of FIG. 14, shown to include light guiding elements receiving light emitted by LEDs and guiding the emitted light, according to some embodiments.

Referring now to FIG. 19, a side view of LED board 1002 and halo 112 is shown, according to some embodiments. In some embodiments, light emitted by LED 1004 is received by wave guide 1504 (e.g., through receiving post 1506), travels through sweep portion 1508, and exits halo 112 through exterior surface 1710 of rim 1502. In some embodiments, light emitted by LED 1004 follows path 1902, generally. In some embodiments, path 1902 is path 1722. In some embodiments, if exterior surfaces of wave guide 1504 are coated (e.g., cladded) with an opaque material, light emitted by LED 1004 travels through wave guide 1504 and reflects off the opaque material. In some embodiments, halo 112 facilitates a glow of emitted light along exterior surface 1710 of halo 112. In some embodiments, halo 112 diffuses light along sides 108 of display device 100. In some embodiments, halo 112 is manufactured from or includes (e.g., at exterior surface 1710) a light diffusing material. In some embodiments, halo 112 is translucent. In some embodiments, halo 112 is transparent. In some embodiments, halo 112 acts as a lens and focuses light emitted by LED 1004 along sides 108. In some embodiments, light emitted by LED 1004 which enters wave guide 1504 is substantially bounded by exterior surfaces of wave guide 1504 and only enters wave guide 1504 through receiving post 1506 and only exits wave guide 1504 at rim 1502.

Halo 112 facilitates a wider off-axis viewing angle of light emitted by LED 1004, according to some embodiments. In some embodiments, halo 112 facilitates notifying a user regarding information received by or determined by display device 100. In some embodiments, halo 112 enables the notification to be visible by an observer generally facing any of sides 108. In some embodiments, halo 112 enables notifications to an observer when the observer cannot view user interface 106.

LED Controller

Figure 20:
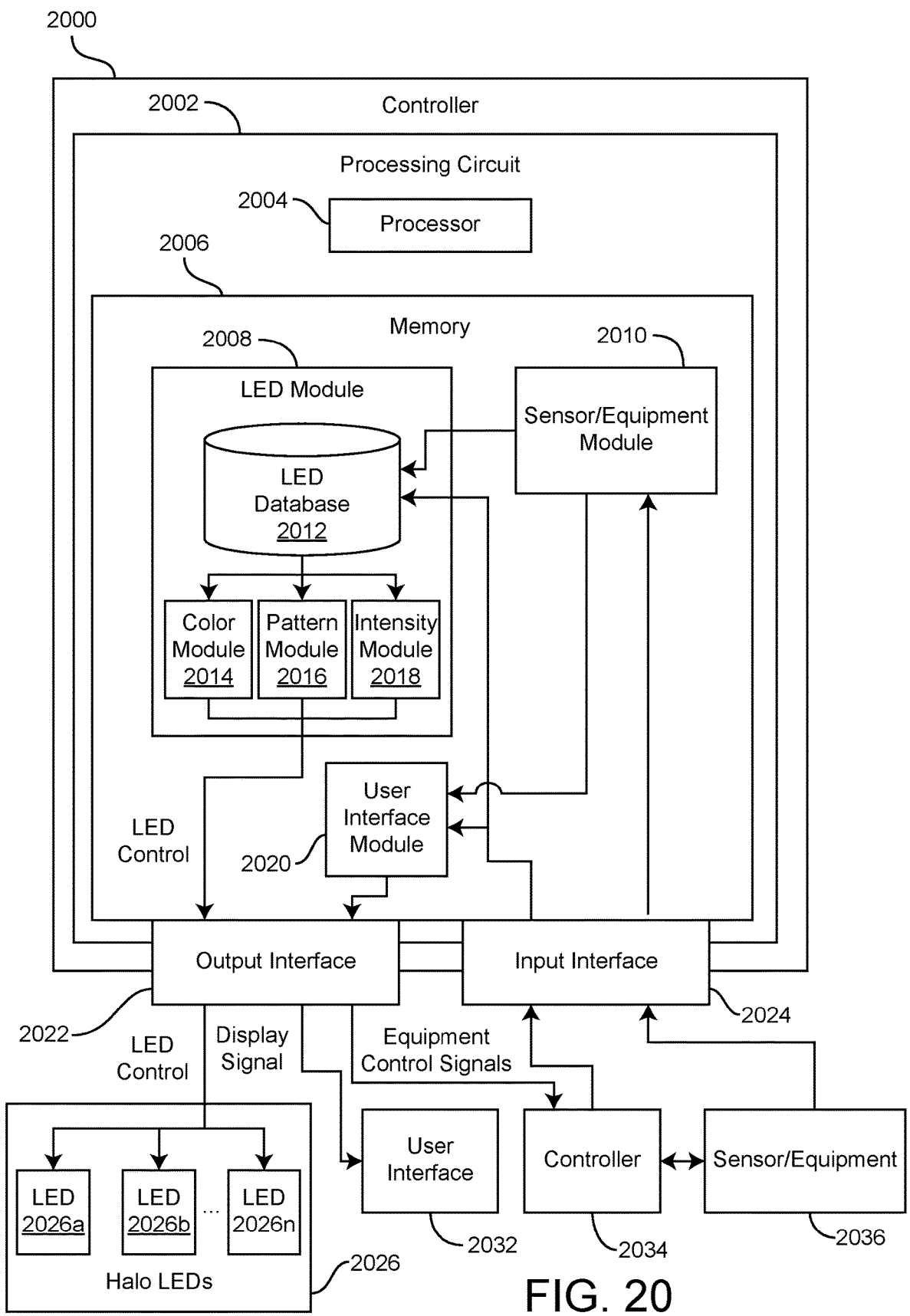
FIG. 20 is a block diagram of an LED controller, according to some embodiments.

Referring now to FIG. 20, a controller 2000 is shown, according to some embodiments. In some embodiments, controller 2000 is or is included in LED board 1002. In some embodiments, controller 2000 is or is included in controller 802. In some embodiments, any of the functionality of controller 2000 is included in any of controller 802 and LED board 1002. In some embodiments, controller 2000 is disposed within display device 100 and is communicably connected to at least one of controller 802 and LED board 1002. In some embodiments, controller 2000 is positioned outside display device 100 and is communicably connected to any controllers (e.g., controller 802, LED board 1002, etc.) of display device 100. Still referring to FIG. 20, controller 2000 is shown to include communications interfaces shown as input interface 2024, and output interface 2022. Interfaces 2024 and 2022 can include any number of jacks, wire terminals, wire ports, wireless antennas, or other communications interfaces for communicating information and/or control signals. Interfaces 2024 and 2022 can be the same type of devices or different types of devices. For example, input interface 2024 can be configured to receive an analog feedback signal (e.g., an output variable, a measured signal, a sensor output, a controlled variable) from sensor/equipment 2036 or a digital signal from controller 2034. Output interface 2022 can be a digital output (e.g., an optical digital interface) configured to provide a digital control signal (e.g., a manipulated variable, a control input) to user interface 2032 and/or LEDs 2026. In some embodiments, output interface 2022 is configured to provide an analog output signal. In some embodiments, output interface 2022 is configured to provide an analog output signal and a digital output signal.

In some embodiments interfaces 2022 and 2024 can be joined as one interface rather than two separate interfaces. For example, output interface 2022 and input interface 2024 can be combined as one Ethernet interface configured to receive network communications from controller 2034 or a network. In some embodiments, controller 2034 provides both a setpoint and feedback via an Ethernet network. In some embodiments, output interface 2022 can be another standardized communications interface for communicating data or control signals (e.g., analog or digital). Interfaces 2024 and 2022 can include communications electronics (e.g., receivers, transmitters, transceivers, modulators, demodulators, filters, communications processors, communication logic modules, buffers, decoders, encoders, encryptors, amplifiers, etc.) configured to provide or facilitate the communication of the signals described herein.

Still referring to FIG. 20, controller 2000 is shown to include a processing circuit 2002 having a processor 2004 and memory 2006. Processor 2004 can be a general purpose or specific purpose processor, an application specific integrated circuit (ASIC), one or more field programmable gate arrays (FPGAs), a group of processing components, or other suitable processing components. Processor 2004 is configured to execute computer code or instructions stored in memory 2006 or received from other computer readable media (e.g., CDROM, network storage, a remote server, etc.).

Memory 2006 can include one or more devices (e.g., memory units, memory devices, storage devices, etc.) for storing data and/or computer code for completing and/or facilitating the various processes described in the present disclosure. Memory 2006 can include random access memory (RAM), read-only memory (ROM), hard drive storage, temporary storage, non-volatile memory, flash memory, optical memory, or any other suitable memory for storing software objects and/or computer instructions. Memory 542 can include database components, object code components, script components, or any other type of information structure for supporting the various activities and information structures described in the present disclosure. Memory 542 can be communicably connected to processor 540 via processing circuit 538 and can include computer code for executing (e.g., by processor 540) one or more processes described herein.

Referring still to FIG. 20, controller 2000 is shown receiving information from at least one of sensor/equipment 2036 and controller 2034, according to some embodiments. In some embodiments, controller 2000 receives information from sensor/equipment 2036 and determines an operation of LEDs 2026 corresponding to the information received. In some embodiments, LEDs 2026 are LEDs 1004. In some embodiments, LEDs 2026 are LED board 1002. In some embodiments, controller 2000 is configured to determine an event (e.g., temperature exceeding a threshold value, emergency event, etc.) and is configured to adjust an operation of LEDs 2026 for the event. In some embodiments, controller 2000 receives information regarding an event from controller 2034 and adjusts an operation of at least one of user interface 2032 and LEDs 2026 for the event. In some embodiments, sensor/equipment 2036 is any of a temperature sensor, an air quality detector, building equipment, etc., or any other sensor or equipment. In some embodiments, sensor/equipment 2036 is more than one sensor and/or more than one equipment. For example, controller 2000 receives information from multiple temperature sensors, according to some embodiments.

Controller 2000 is shown receiving information from sensor/equipment 2036 through input interface 2024. In some embodiments, sensor/equipment module 2010 receives the information from sensor/equipment 2036. In some embodiments, sensor/equipment module 2010 receives the information from sensor/equipment 2036 and determines an event based on the received information. For example, in some embodiments, sensor/equipment module 2010 periodically receives temperature information from a temperature sensor and determines if the received temperature exceeds a predetermined threshold value. In another example, sensor/equipment 2036 receives information from an indoor air quality sensor (e.g., a carbon monoxide detector) and determines if the received indoor air quality information is less than a predetermined threshold value. In some embodiments, controller 2000 receives information from any of one or more controller, one or more equipment devices, one or more sensors, a network, etc., and determines an operation of user interface 2032 and/or LEDs 2026 based on the received information. Controller 2000 may receive information through a wired connection at input interface 2024, a wireless connection at input interface 2024, or a combination of both.

In some embodiments, sensor/equipment module 2010 determines an event based on the received information and provides the event to LED module 2008. For example, if sensor/equipment module 2010 determines that the indoor air quality has dropped below a predetermined value, sensor/equipment module 2010 provides the determined event to LED module 2008. In some embodiments, sensor/equipment module 2010 provides the information received from sensor/equipment 2036 to user interface module 2020. For example, in some embodiments, if sensor/equipment module 2010 receives temperature information from sensor/equipment 2036, sensor/equipment module 2010 provides the temperature information to user interface module 2020. In some embodiments, user interface module 2020 is configured to determine control signals for user interface 2032 to display the information received from sensor/equipment module 2010 to a user. In some embodiments, sensor/equipment module 2010 is configured to provide LED module 2008 with at least one of information received through input interface (from at least one of controller 2034 and sensor/equipment 2036) and the determined or received event.

In some embodiments, user interface module 2020 is configured to determine control signals for user interface 2032. In some embodiments, user interface 2032 is user interface 106. In some embodiments, user interface module 2020 is configured to determine control signals for user interface 2032 to display messages, information, graphical representations of information, data, etc. In some embodiments, user interface module 2020 also receives information from user interface 2032 through input interface 2024. In some embodiments, user interface module 2020 receives commands, directives, requests, etc., from user interface 2032 and adjusts an operation (e.g., a displayed message) of user interface 2032 based on the command, request, etc., received from user interface 2032. In some embodiments, user interface module 2020 receives a request from user interface 2032 to display certain data, and user interface module 2020 adjusts an operation of user interface 2032 to display the requested data.

In some embodiments, controller 2000 receives any of information and an event from controller 2034. For example, in some embodiments, controller 2034 is communicably connected with sensor/equipment 2036 and is configured to analyze, process, group, etc., information form sensor/equipment 2036 and determine if an event has occurred. In some embodiments, controller 2034 provides the information and/or event data to at least one of user interface module 2020 and LED module 2008.

Referring still to FIG. 20, memory 2006 is shown to include LED module 2008, according to some embodiments. In some embodiments, LED module 2008 is configured to determine an operation of one or more LEDs (e.g., LEDs 2026, LEDs 1004) based on information received from any of sensor/equipment module 2010, user interface module 2020, user interface 2032, controller 2034, and sensor/equipment 2036. LED module 2008 determines any of a color, a pattern, an intensity, etc., of the one or more LEDs based on the received information and determines signals to adjust an operation of one or more LEDs based on the received information.

LED module 2008 is shown to include an LED database 2012, a color module 2014, a pattern module 2016, and an intensity module 2018. In some embodiments, LED database 2012 stores information regarding a patterned operation of one or more LEDs based on a received event and/or received information. For example, if LED module 2008 receives an event from sensor/equipment module 2010, controller 2034, sensor/equipment 2036, etc., indicating that the indoor air quality has dropped below a predetermined value, LED module 2008 may retrieve a set of instructions from LED database 2012 regarding an operation of LEDs based on the event. In some embodiments, LED database 2012 includes information regarding an operation of LEDs for a variety of events, including but not limited to, an increased temperature event, a decreased temperature event, a low indoor air quality event, an emergency event, a fire detection event, an equipment failure event, a calendar date event, a time of day, etc. In some embodiments, LED database 2012 includes a set of predetermined instructions regarding an operation of LEDs for each of these events.

In some embodiments, LED database 2012 includes a set of predetermined instructions for each of a set of predefined events. In some embodiments, LED database 2012 can be updated and/or customized. For example, in some embodiments, LED database 2012 can receive directives from user interface 2032 to change an operation of one or more of the LEDs (e.g., color, on-off pattern, intensity, timing, etc.) to modify the predetermined instructions for one or more of the predefined events. In some embodiments, additional events can be added to LED database 2012 along with corresponding LED operation instructions for the additional events. In some embodiments, for example, controller 2000 includes a wireless radio (e.g., a Bluetooth wireless radio) configured to interface with a user device (e.g., a smartphone). The LED database 2012 is configured to be updated or modified based on directives received from the user device. For example, if a user wants to be notified/reminded of an event on a certain date at a specific time, the user may add an event to LED database 2012 to adjust an operation of one or more LEDs according to a predetermined pattern, set of rules, etc., on the certain date at the specific time.

In some embodiments, upon receiving an event and/or information, LED database 2012 provides the instructions to color module 2014, pattern module 2016, and intensity module 2018. For example, if LED database 2012 receives a night-time event (e.g., from a clock or from a light detector), LED database 2012 may retrieve a specific set of instructions (e.g., dim all LEDs by 50%, turn off several LEDs, adjust a color of one or more LEDs to blue, etc.) for the LEDs (e.g., LEDs 2026, LEDs 1004, etc.) corresponding to the night-time event.

In some embodiments, LED database 2012 includes instructions for various events to adjust a color of one or more of the LEDs (e.g., red, blue, green, etc.), adjust an intensity of one or more of the LEDs, turn one or more of the LEDs on or off, patterningly adjust a color of one or more of the LEDs, patterningly adjust an intensity of one or more of the LEDs, patterningly turn one or more of the LEDs on or off, etc. In some embodiments, any of the color, intensity, on/off state, etc., of the one or more LEDs is patterned over time (e.g., all LEDs are turned on for 5 seconds, then turned off for 5 seconds, and this is repeated), or patterned based on a predetermined position of the one or more LEDs (e.g., turn a first LED on, then turn a second LED on, then turn a third LED on and turn the first LED off, then turn a fourth LED on and turn the second LED off, then turn a fifth LED on and turn the third LED off, etc.), or patterned based on both time and position of the one or more LEDs.

In some embodiments, one or more of the set of instructions stored in LED database 2012 extend for a time duration, and are repeated. For example, some of the sets of instructions may last for five seconds (e.g., a patterned operation of the LEDs for five seconds) and be repeated a predetermined number of times, while other sets of instruction may last only two seconds (e.g., increase intensity from 0% to 100% for all LEDs over a 1 second time duration, then decrease intensity from 100% to 0% for all LEDs over a 1 second time duration), and repeated.

In some embodiments, sets of instructions are combined. For example, in some embodiments, all events which indicate an increase in temperature include a same patterned intensity operation of LEDs (e.g., linearly increase intensity of all LEDs from 0% to 100% over a five second time window). However, within the set of all events which indicate an increase in temperature, other operations of the LEDs (e.g., color) may vary based on other factors (e.g., which temperature from a set of temperatures is increasing, how fast the temperature increases, etc.).

Any of the color, pattern, intensity, etc., of the one or more LEDs may be adjusted over a time window linearly (e.g., increase intensity from 0% to 100% linearly over a 5 second time window) or may be adjusted over a time window non-linearly (e.g., increase intensity from 0% to 100% according to an exponential function, a polynomial, etc.).

In some embodiments, the instructions stored in LED database 2012 depend on the particular types of LEDs used. For example, some LEDs may not be multi-color LEDs and may only actuate between an on state and an off state, according to some embodiments. In some embodiments, LED database 2012 stores a map of positions of the LEDs and abilities of each of the LEDs (e.g., dimming abilities, maximum light intensity, etc.).

In some embodiments, controller 2000 does not include LED database 2012, and receives instructions from any of controller 2034 and/or a network to adjust an operation of any of a color, a pattern, an intensity (e.g., dimming), etc., of any of the LEDs.

Referring still to FIG. 20, LED module 2008 is shown including color module 2014, pattern module 2016 and intensity module 2018. In some embodiments, color module 2014, pattern module 2016, and intensity module 2018 are configured to determine any of voltage, current, digital signals, analog signals, etc., to adjust an operation of one or more LEDs according to the determined operation received from any of LED database 2012, controller 2034, etc. LED module 2008 may include any predefined script objects, functions, or electrical components (e.g., resistors, capacitors, inductors, transformers, etc.) necessary to determine voltage, current, etc., required to operate the LEDs to produce the desired operation. In some embodiments, LED module 2008 uses Pulse Width Modulation and adjusts a duty cycle to change a brightness of one or more of the LEDs.

In some embodiments, LED module 2008 is connected to one or more LEDs (e.g., LEDs 2026, LEDs 1004, etc.). In some embodiments, LED module 2008 adjusts an operation of the one or more LEDs to produce the desired effect (e.g., dimming, changing color, patterned dimming, patterned change in color, etc.). In some embodiments, the one or more LEDs each correspond to one or more wave guide 1504 to any of diffuse, direct, scatter, focus, etc., light emitted by the one or more LEDs along sides 108 of display device 100.

Additional Examples

Figure 21:
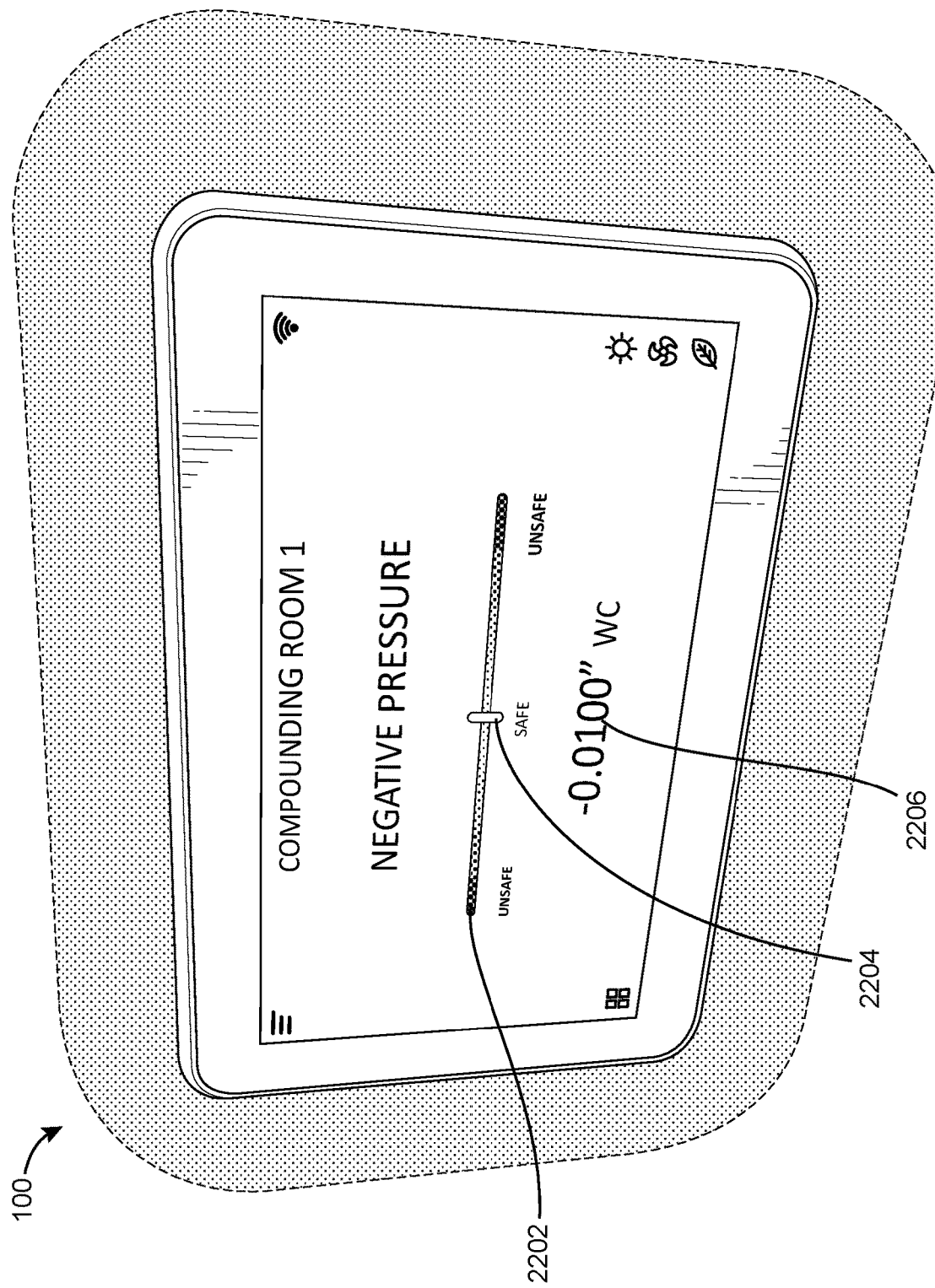
FIG. 21 is a front perspective view of the display device of FIG. 1, according to some embodiments.
Figure 22:
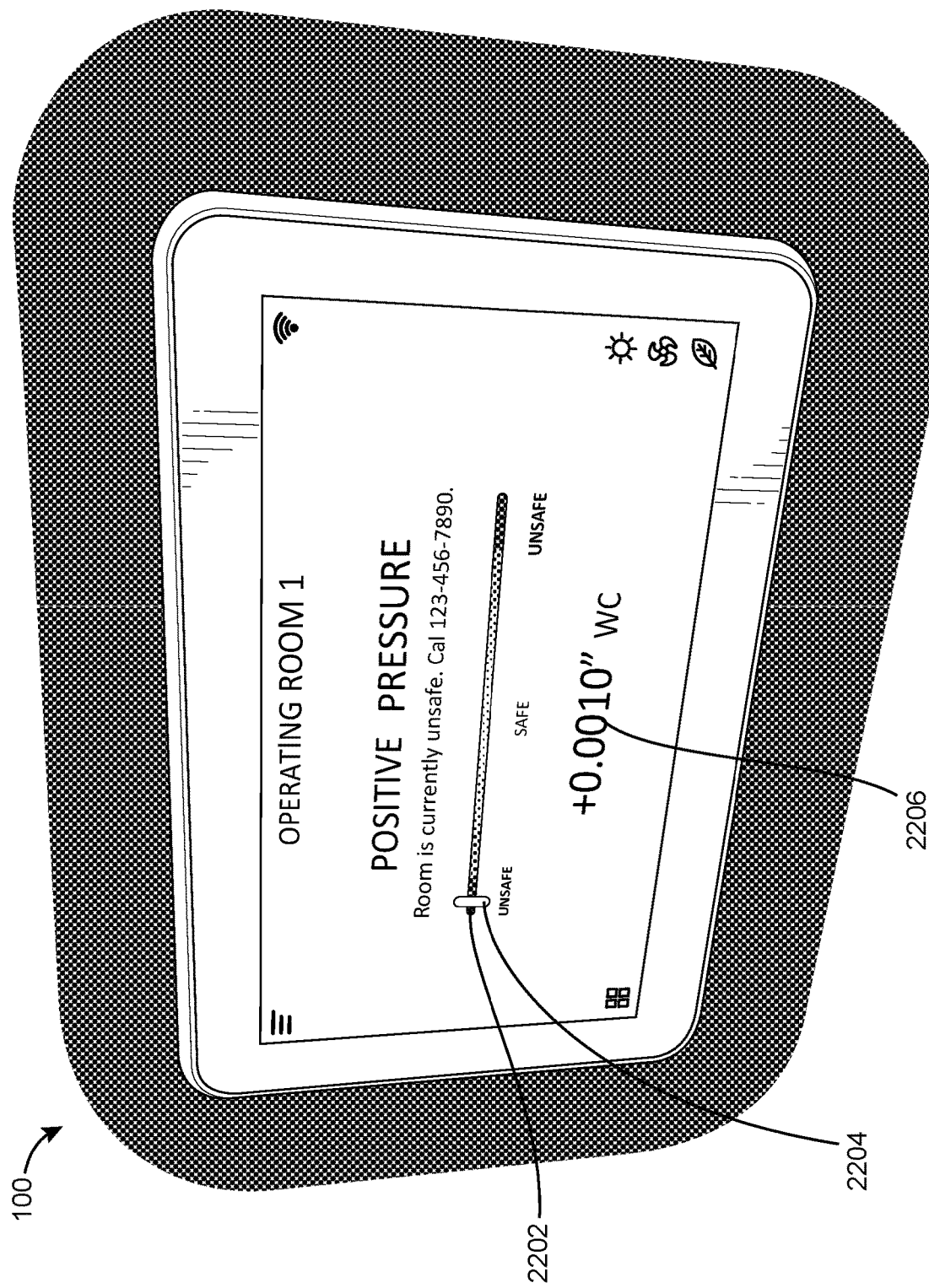
FIG. 22 is a front perspective view of the display device of FIG. 1, according to some embodiments.

Referring now to FIGS. 21-22, display device 100 is shown, according to some embodiments. In some embodiments, display device 100 is configured to display a multicolored status bar 2202. In some embodiments, multicolored status bar 2202 is at a center of a display screen of display device 100. In some embodiments, multicolor status bar 2202 varies in color along its length from red to yellow to green and then back to yellow to red. In some embodiments, an indicator 2204 (shown as a white tick mark) shows a current real-time pressure on multicolored status bar 2202. In some embodiments, the current real-time pressure represents a current alarm status. In some embodiments, as the pressure reading ventures outside of the normal operating range (indicated by the green section of multicolor status bar 2202), the indicator 2204 (e.g., a real-time indicator) moves towards the yellow section of the multicolor status bar 2202 indicating a warning condition. In some embodiments, if the pressure continues away from the normal operating range beyond limits of a warning range, and enters an alarm range, the indicator 2204 moves into a red section of the multicolor status bar 2202 indicating an alarm condition. In some embodiments, display device 100 displays text 2206 representing the differential pressure (e.g., in "wc") which tracks the gradient color of the multicolor status bar 2202. In some embodiments, a color of light emitted through halo 112 tracks the gradient color of the multicolor status bar 2202. In some embodiments, this provides an overall consistent display device 100 rather than just displaying red, yellow, or green for alarm, warning, or normal, respectively. In some embodiments, halo 112 tracking the gradient color of the multicolor status bar 2202 (or a corresponding color of multicolor status bar 2202 at indicator 2204) provides consistency with the rest of display device 100.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

What is claimed is:

1. A display device comprising:
an enclosure comprising a front portion, a rear portion, and sides;
a halo comprising a rim and an internal structure, wherein the rim is positioned between the front portion and the rear portion and the internal structure of the halo is at least partially within the enclosure; and
a circuit board comprising light emitting devices mounted to a planar surface of the circuit board, the planar surface being parallel to the front portion and wherein a light path of a light leaving the light emitting devices and entering the internal structure of the halo is perpendicular to the planar surface and is turned to the rim by the internal structure, the rim extending directly between and sandwiched between surfaces of the front portion and the rear portion in an outwards direction that is parallel with the planar surface of the circuit board past an edge of the circuit board, the rim defining an end of the halo configured to emit the light out of the sides of the enclosure to an exterior of the enclosure along at least an emitting light path that is parallel with the planar surface of the circuit board, the light and the end of the halo configured to be viewed by an observer facing the side of the display device and a distance from the display device along a direction parallel with the planar surface of the circuit board.

2. The display device of claim 1, further comprising:
a controller configured to adjust at least one of a brightness and a color of at least one of the light emitting devices and wherein the halo is configured to at least one of guide, direct, diffuse, focus, and scatter the light emitted by the light emitting devices along or outwards from at least a portion of the sides of the display device through the rim.

3. The display device of claim 1, wherein the internal structure comprises a receiving post extending from a second end of a sweep portion.

4. The display device of claim 3, wherein a width of the sweep portion varies along a path of the sweep portion.

5. The display device of claim 4, wherein the width of the sweep portion decreases from a first end of the sweep portion to the second end of the sweep portion, and wherein a final width of the sweep portion is substantially equal to a width of the receiving post.

6. The display device of claim 1, wherein the halo comprises at least one of a translucent and a transparent material and is configured to allow the light to pass through.

7. The display device of claim 1, wherein the internal structure is positioned within the enclosure, and wherein the rim is positioned between the front portion and the rear portion.

8. The display device of claim 1, wherein the front portion comprises a display and touch screen configured to display information, wherein the display and touch screen extends from a first edge to a second edge of a top planar surface of the front portion.

9. The display device of claim 1, wherein the front portion comprises a display screen configured to display information, wherein the display screen extends to all four edges at a top planar surface of the front portion.

10. An alert system for a monitored condition, the system comprising:
a sensor configured to provide a signal regarding the monitored condition; and
a display device comprising:
an enclosure comprising a front portion, a rear portion, and sides;
a halo comprising a rim and an internal structure, wherein the rim is positioned between the front portion and the rear portion and the internal structure of the halo is at least partially within the enclosure; and
a circuit board comprising light emitting devices mounted to a planar surface of the circuit board, the planar surface being parallel to the front portion and wherein a light path of a light leaving the light emitting devices and entering the internal structure of the halo is perpendicular to the planar surface and is turned to the rim by the internal structure, the rim extending directly between and sandwiched between surfaces of the front portion and the rear portion in a plurality of outwards directions that are parallel with the planar surface of the circuit board, the rim defining an end of the halo configured to emit the light out of the sides of the enclosure to an exterior of the enclosure along at least an emitting light path that is parallel with the planar surface of the circuit board, the light and the end of the halo configured to be viewed by an observer facing the side of the display device and a distance from the display device along a direction parallel with the planar surface of the circuit board;
wherein the front portion extends forwards of the rim in the direction that is normal to the planar surface of the circuit board and the rear portion extends rearwards of the rim in the direction that is normal to the planar surface of the circuit board.

11. The alert system of claim 10, further comprising a controller configured to receive signal form the sensor and adjust one or more operations of one or more of the light emitting devices based at least in part on the signal, wherein the controller is configured to patterningly adjust at least one of a brightness or a color of one of more of the one or more light emitting devices.

12. The alert system of claim 11, wherein a display screen of the display device comprises a touch screen.

13. The alert system of claim 10, wherein the internal structure comprises a receiving post extending from a second end of a sweep portion.

14. The alert system of claim 10, wherein the front portion includes a slanted edge between the four edges at the top planar surface and four edges proximate the halo.

15. The alert system of claim 10 wherein the halo is configured to diffuse the light along one or more surfaces of at least one of the front portion and the rear portion.

16. A display device comprising:
an enclosure comprising a front portion, a rear portion, and a side portion, wherein the rear portion comprises a rear end portion and a front end portion, the rear end portion having a smaller size than the front end portion and the side portion, and defining a step between the rear end portion and the front end portion;
a halo comprising a rim and an internal structure, wherein the rim is positioned between the front portion and the rear portion and the internal structure of the halo is at least partially within the enclosure, the halo configured to receive light from one or more light emitting devices positioned on a circuit board within the rear end portion and guide light past the step and direct light out of the rim through the side portions; and a sensor configured to measure a parameter of a conditioned space;

wherein the circuit board is configured to receive the parameter of the conditioned space and adjust at least one of a brightness or a color of one or more of the one or more light emitting devices based at least in part on the parameter.

17. The display device of claim 16, wherein:

the one or more light emitting devices are mounted to a planar surface of the circuit board, the planar surface being parallel to the front portion and wherein a light path of a light from the light emitting devices is perpendicular to the planar surface and is turned to the rim by the internal structure.

18. The display device of claim 17, wherein the front portion comprises a display screen configured to display information, wherein the display screen extends to all four edges at a top planar surface of the front portion.

19. The display device of claim 16, wherein the front portion comprises a display screen configured to display information, wherein the display screen extends to all four edges at a top planar surface of the front portion.

20. The display device of claim 16, wherein the front portion includes a slanted edge between the four edges at the top planar surface and four edges proximate the halo and wherein the rear end portion has a smaller perimeter than the front end portion.

\* \* \* \* \*